United States Patent
Davies et al.

(10) Patent No.: US 11,146,103 B1
(45) Date of Patent: Oct. 12, 2021

(54) DISTRIBUTION GRID MONITORING

(71) Applicant: University of Hawai'i, Honolulu, HI (US)

(72) Inventors: Kevin Lee Davies, Honolulu, HI (US); Thai Tran, Honolulu, HI (US); Saeed Sepasi, Honolulu, HI (US); Leon Roy Roose, Kaneohe, HI (US)

(73) Assignee: University of Hawai'i, Honolulu, HI (US)

( * ) Notice: Subject to any disclaimer, the term of this patent is extended or adjusted under 35 U.S.C. 154(b) by 380 days.

(21) Appl. No.: 16/198,761

(22) Filed: Nov. 21, 2018

Related U.S. Application Data

(60) Provisional application No. 62/589,450, filed on Nov. 21, 2017, provisional application No. 62/692,613, filed on Jun. 29, 2018.

(51) Int. Cl.
 *H02J 13/00* (2006.01)
 *H02J 9/06* (2006.01)
 (Continued)

(52) U.S. Cl.
 CPC ...... *H02J 13/0006* (2013.01); *G05B 19/0428* (2013.01); *G06F 9/4401* (2013.01);
 (Continued)

(58) Field of Classification Search
 CPC .. H02M 1/42; G05B 15/02; G05F 1/70; H02J 3/00; Y02B 90/20; Y02E 70/30;
 (Continued)

(56) References Cited

U.S. PATENT DOCUMENTS 8,718,829 B2  5/2014  Coyne et al.
10,330,812 B1  6/2019  Barnett et al.
(Continued)

FOREIGN PATENT DOCUMENTS

WO    2019101433    5/2019

OTHER PUBLICATIONS

Sharma et al., Detection of Power Quality Disturbances Using Discrete Wavelet Transform, Dec. 2016, Maulana Azad National Institute of Technology, Bhopal, India, p. 540-545. (Year: 2016).*

*Primary Examiner* — Kidest Bahta
(74) *Attorney, Agent, or Firm* — Behmke Innovation Group LLC; James M. Behmke; James J. Wong

(57) ABSTRACT

In one embodiment, a device configured to monitor a power grid determines whether a configuration of a field-programmable gate array (FPGA) of the device requires updating, the configuration comprising one or more digital signal processor (DSP) applications (apps), and updates the configuration when required. The device measures grid metrics of a power grid (e.g., voltage and current), and also determines GPS-based time for synchronizing zero crossing events of the grid metrics to the GPS-based time. According to the one or more DSP apps, the grid metrics can be processed by the device, and then the processed grid metrics and synchronized zero crossing events can be shared. In one specific embodiment, processing the grid metrics according to the one or more DSP apps comprises estimating an impedance of one or more individual circuit segments based on measured grid metric response to a transient event (e.g., active or passive events).

45 Claims, 22 Drawing Sheets

(51) Int. Cl.
*H02J 3/38* (2006.01)
*G05B 19/042* (2006.01)
*G06F 9/4401* (2018.01)

(52) U.S. Cl.
CPC .............. *H02J 3/383* (2013.01); *H02J 9/061* (2013.01); *G05B 2219/2639* (2013.01); *H02J 2203/20* (2020.01)

(58) Field of Classification Search
CPC ...... G01R 19/2513; G01R 22/10; H04B 3/46; H04B 3/50; Y04S 20/30; G06Q 50/06
See application file for complete search history.

(56) References Cited

U.S. PATENT DOCUMENTS

| | | | | |
|---|---|---|---|---|
| 2014/0152331 | A1* | 6/2014 | Wagoner | G01R 27/16 324/705 |
| 2015/0094965 | A1* | 4/2015 | Schneider | H02H 6/00 702/58 |
| 2015/0378380 | A1* | 12/2015 | Slota | H02J 3/42 700/298 |
| 2018/0373304 | A1 | 12/2018 | Davis et al. | |
| 2021/0011093 | A1* | 1/2021 | Beaudet | H04Q 9/02 |

* cited by examiner

```
                                    2000
           START                   ↙
           2005
```

2010 - DETERMINING, BY A DEVICE CONFIGURED TO MONITOR A POWER GRID, WHETHER A CONFIGURATION OF A FIELD-PROGRAMMABLE GATE ARRAY (FPGA) OF THE DEVICE REQUIRES UPDATING, THE CONFIGURATION COMPRISING ONE OR MORE DIGITAL SIGNAL PROCESSOR (DSP) APPLICATIONS (APPS);

2015 - UPDATING, BY THE DEVICE WHEN REQUIRED, THE CONFIGURATION OF THE FPGA;

2020 - MEASURING, BY THE DEVICE, GRID METRICS OF A POWER GRID, THE GRID METRICS COMPRISING AT LEAST A VOLTAGE AND A CURRENT OF ONE OR MORE MEASURED PHASES OF THE POWER GRID;

2025 - DETERMINING, BY THE DEVICE, A GLOBAL POSITIONING SATELLITE (GPS)-BASED TIME;

2030 - SYNCHRONIZING, BY THE DEVICE, ZERO CROSSING EVENTS OF THE GRID METRICS TO THE GPS-BASED TIME;

2035 - PROCESSING, BY THE DEVICE ACCORDING TO THE ONE OR MORE DSP APPS, THE GRID METRICS; AND

2040 - SHARING, BY THE DEVICE, THE PROCESSED GRID METRICS AND SYNCHRONIZED ZERO CROSSING EVENTS.

```
           END
           2045
```

FIG. 20

DISTRIBUTION GRID MONITORING

RELATED APPLICATIONS

This application claims priority to U.S. Provisional Application No. 62/589,450, filed on Nov. 21, 2017, entitled "Distribution Grid Power Monitor", by Davies, et al., the contents of which are hereby incorporated by reference.

This application also claims priority to U.S. Provisional Application No. 62/692,613, filed on Jun. 29, 2018, entitled "Enabling Ubiquitous Distribution Grid Modeling for Enhanced Visibility and Controls", by Davies, et al., the contents of which are hereby incorporated by reference.

GOVERNMENT SUPPORT

This invention was made with government support under grant no. N00014-12-1-0496 awarded by the Department of the Navy/Office of Naval Research. The government has certain rights in the invention.

TECHNICAL FIELD

The present disclosure relates generally to power grid technology, and, more particularly, to distribution grid monitoring, analysis, and control.

BACKGROUND

Most electric distribution circuits or "grids" still around today, and particularly in the United States, were built before the advent of significant distributed energy resources (DER) such as distributed photovoltaics (DPV). Before DER, energy flowed only one way—from the utility to the customers. The grid was designed to compensate for the voltage drops that occur along the distribution lines from the utility substation to the most distant customers. With significant DER, however, these drops are reduced in magnitude or even reversed, often requiring the utility companies to adjust settings or upgrade equipment. To further aggravate the issue, DPV in particular is variable not only over the course of a day, but also on a minute or second timeframe due to cloud movement. Certain strategies such as reactive power injection are being introduced to accommodate this variability, but they rely to varying degrees on knowledge of the impedances of the distribution lines and transformers. In most cases, this information is not precisely known and is expensive to obtain because it requires physical surveys and manual tests.

Said differently, with increasing penetrations of rooftop photovoltaic (PV) and other DER, utilities need much better visibility and control of these largely intermittent resources and their effects on the grid. Despite solutions for connecting to PV inverters and demand response (DR)-enabled appliances, there is a large gap in visibility between residences and the head of the distribution feeder or load tap changers where supervisory is control and data acquisition (SCADA) equipment traditionally exists. Solutions such as distribution transformer monitors (DTMs) can provide voltage and current measurements, but the measurements are coarse (on the order of minutes), and there are no provisions for controls or other advanced onboard features. Distribution energy resource management systems (DERMS) are able to control distributed assets such as PV inverters and DR-enabled appliances, but they have limited knowledge of the effect of these assets on the distribution circuit due to the measurement gap between customers and the feeder head. DERMS have power flow models to help fill the gap, but the parameters for these models are not precisely known. Also, the control performance of DERMS is limited by the communications latency between the server location or cloud and the end device (PV inverter or other appliance).

In order to maintain a stable and reliable grid, electric utilities require numerous ancillary services along with the raw power production. These services include voltage regulation, frequency regulation, and operating reserves to protect against the failure of generation plants and the variability of loads and renewable energy. Although PV introduces variability and may require additional operating reserves, it can provide other ancillary services such as reactive power compensation, voltage regulation, flicker control, active power filtering, and harmonic cancellation. Much of the previous DPV research has focused on these physical ancillary services.

Still, the lack of real-time visibility into the operation of the distribution grid, as well as the lack of flexible control over the grid, has become even more burdensome given the many new influences on the traditional power distribution model.

SUMMARY

The techniques herein relate generally to a distribution grid monitor, using distributed edge computing with advanced flexibility and control. In particular, a device described herein supports advanced electric grid operation at the distribution level by performing measurements and communicating these measurements over a wireless mesh network to a gateway device. The illustrative device has onboard signal processing to identify key events and conditions on the grid and to send control signals in response. Notably, the configuration of the device and its firmware can be updated over the mesh network, where the firmware accepts subprograms or apps that can perform independent control and monitoring functions. In one embodiment, the device has a Global Positioning Satellite (GPS) receiver for automatic location with the Geographical Information System (GIS) and accurate global time synchronization. The time synchronization can be used to determine phase shift between the devices by comparing the time of zero crossing events, thus allowing for correlation of other events on the grid. The mesh network may be encrypted and can provide communication for other grid devices such as photovoltaic inverters and appliances with demand response. A gateway device may aggregate the data, process it, and/or stream it to a server for reporting or further processing.

Specifically, according to one or more embodiments of the disclosure, a device configured to monitor a power grid determines whether a configuration of a field-programmable gate array (FPGA) of the device requires updating, the configuration comprising one or more digital signal processor (DSP) applications (apps), and updates the configuration when required. The device measures grid metrics of a power grid (e.g., voltage and current), and also determines GPS-based time for synchronizing zero crossing events of the grid metrics to the GPS-based time. According to the one or more DSP apps, the grid metrics can be processed by the device, and then the processed grid metrics and synchronized zero crossing events can be shared. In one specific embodiment, processing the grid metrics according to the one or more DSP apps comprises estimating an impedance of one or more individual circuit segments based on measured grid metric response to a transient event (e.g., active or passive events).

Furthermore, according to one or more specific embodiments of the disclosure, an apparatus comprises an FPGA (of a device configured to monitor a power grid), and one or more sensors configured to measure grid metrics of a power grid, the grid metrics comprising at least a voltage and a current of one or more measured phases of the power grid. A bootloader is configured on the FPGA to determine whether a configuration of the FPGA requires updating, the configuration comprising one or more DSP apps and to update the configuration of the FPGA when required, wherein the FPGA is configured to process the grid metrics according to the one or more DSP apps. A GPS module is configured to determine GPS-based time, wherein the FPGA is configured to synchronize zero crossing events of the grid metrics to the GPS-based time. The apparatus further comprises a communication interface configured to share the processed grid metrics and synchronized zero crossing events. Note also that in one specific embodiment, processing the grid metrics according to the one or more DSP apps comprises estimating an impedance of one or more individual circuit segments based on measured grid metric response to a transient event (e.g., active or passive events).

Additional and/or alternative embodiments may be described in greater detail below, and this Summary is merely illustrative, and is not meant to be limiting to the scope of the present disclosure.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 20 illustrates an example simplified procedure for distribution grid monitoring in accordance with one or more embodiments herein.

DESCRIPTION OF EXAMPLE EMBODIMENTS

As noted above, in order to improve the resiliency of the electric grid and allow high penetrations of distributed photovoltaics (PV), there is a need for better real-time situational awareness of the distribution circuit. In particular, on circuits with high penetration of PV, power sometimes backfeeds from residential customers to the grid. This can introduce issues such as overvoltage, violations of thermal limits on the electrical lines, and at a system level, the need to provide adequate operational reserves to protect against transient cloud coverage.

Figure 1:
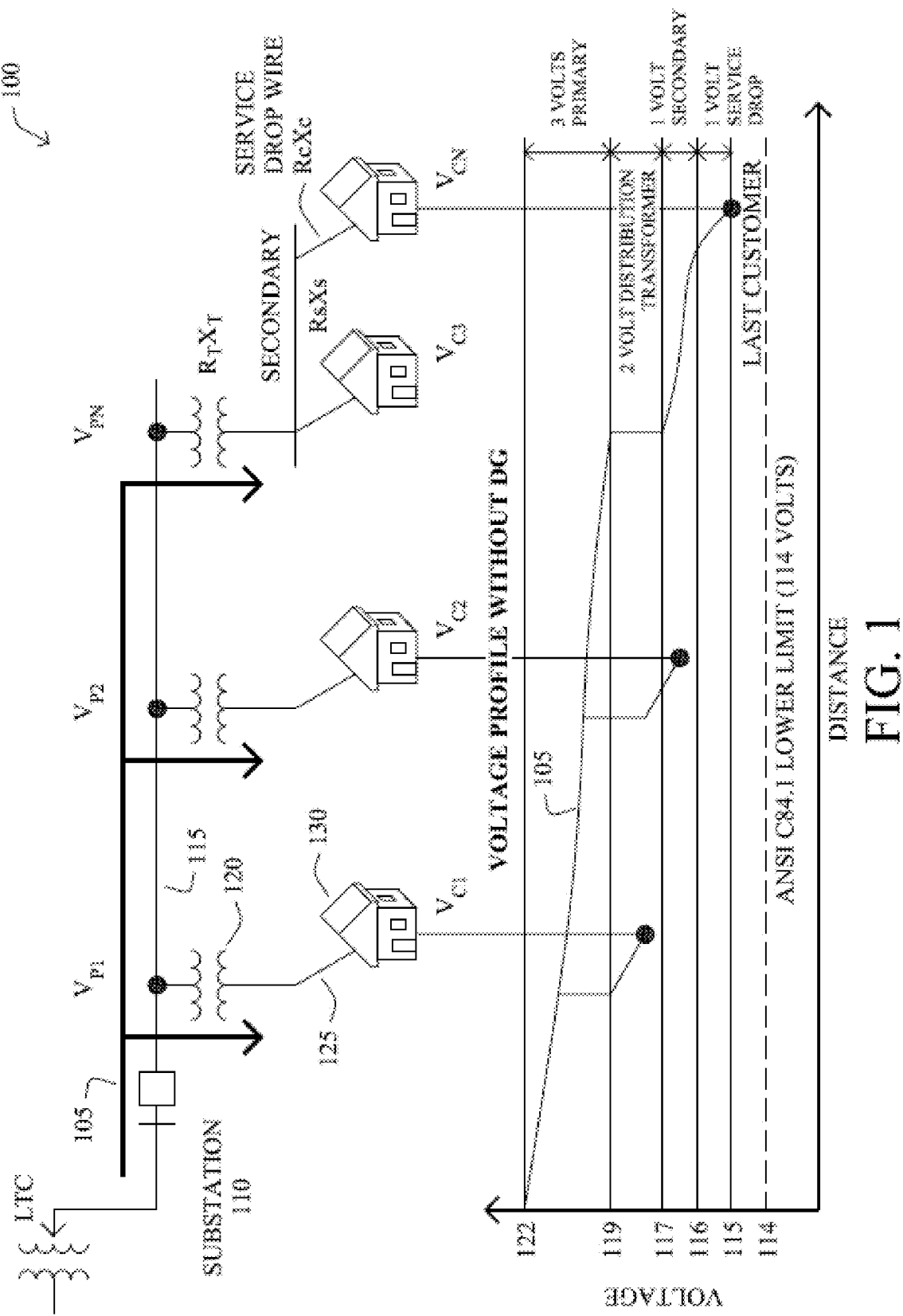
FIG. 1 illustrates an example voltage profile along a power grid feeder line.

That is, traditionally, the power flow on the electric grid is unidirectional: the power flows from the utility generators down to the homes and businesses. The voltage profile of distribution feeders in the traditional power system 100 is illustrated in FIG. 1. As shown, the voltage 105 starts out high at the beginning of the feeder (substation transformer 110) and drops as power flows through cables 115, distribution transformers 120, and service wires 125 before reaching its customers 130. With the advances in distributed generation, e.g. solar rooftop photo-voltaic (PV) systems, power generation at homes and businesses have become quite prevalent, causing the flow of power to be bidirectional. The location and size of these distributed resources contribute to the is voltage profile; there may now be higher voltages at the end of the feeder than the start.

Also, due to the variability of these distributed resources the voltages can be very erratic. For example, in the case of a feeder with solar PV there will be two very different voltage profiles: one profile during the day while the sun is shining and the other during the night when solar PV does not generate power. Further, with the addition of solar PV, feeder voltages can vary and shift in very short (seconds) and random time intervals during the day due to cloud shadows sweeping across PV arrays, in turn resulting in power production swings and erratic voltage fluctuations. As more distributed generation interconnects to the grid, and as more devices change how grid operates nearer to the end points (e.g., electric batteries, and electric vehicle charging, etc.), it becomes increasingly difficult for utilities to effectively manage voltage variability.

Commercial power monitors are currently inadequate for system-wide deployment on the distribution grid: some do not accurately measure reactive power under bi-directional reactive power flow, which is essential for advanced methods of voltage regulation; others provide advanced measurement of reactive power, harmonics, and numerous other metrics, but are very expensive (~$3000/unit) and still require communications equipment with a commercial data plan (up to $100/mo), a power supply, and a weather resistant enclosure. These are designed primarily to record power quality data for post-processing and event detection rather than to stream basic data such as RMS voltage, RMS current, active and reactive power, and frequency in real time for controls and operation. In addition, current commercial distribution transformer monitor (DTM) technology is focused on detecting impending transformer failures and providing data for relatively slow load tap changers (LTCs) (e.g., five to ten minute responsiveness) for long-term health, without modeling or controls.

The techniques herein, therefore, provide for a low-cost, integrated solution for circuit- and system-wide monitoring to address the specific needs of utility operations, particularly under high penetrations of distributed PV, providing high-fidelity information and increased awareness and reliable control of the power grid. Said differently, the techniques herein provide a powerful platform for high-resolution data acquisition from distribution service transformers, with the ability to control distributed energy resources (DER). In order to integrate high amounts of distributed PV and other DER onto the electric grid, utilities need greater awareness of the highly variable conditions introduced by these resources. Accordingly, the techniques herein address this need by providing a high-performance, flexible, robust, low-cost, and easy to install data acquisition system.

As described below, the techniques herein measure voltage, current, and power at the distribution level of the electrical grid, within an architecture that consists of a mesh network with remote meters, passing data to gateways for collection. The distributed devices illustratively consist of a microcontroller which interfaces to a power monitor integrated circuit (IC), using GPS to synchronize time between the devices, allowing for advanced parameter calculation/estimation through distributed computing and correlation. The techniques herein also specifically provide harmonic measurement, rapid (e.g., real-time) reporting rates, parameter identification, onboard modeling, and real-time computational and control. Additionally, the techniques herein provide for centralized data analytics and reporting/display.

Figure 2:
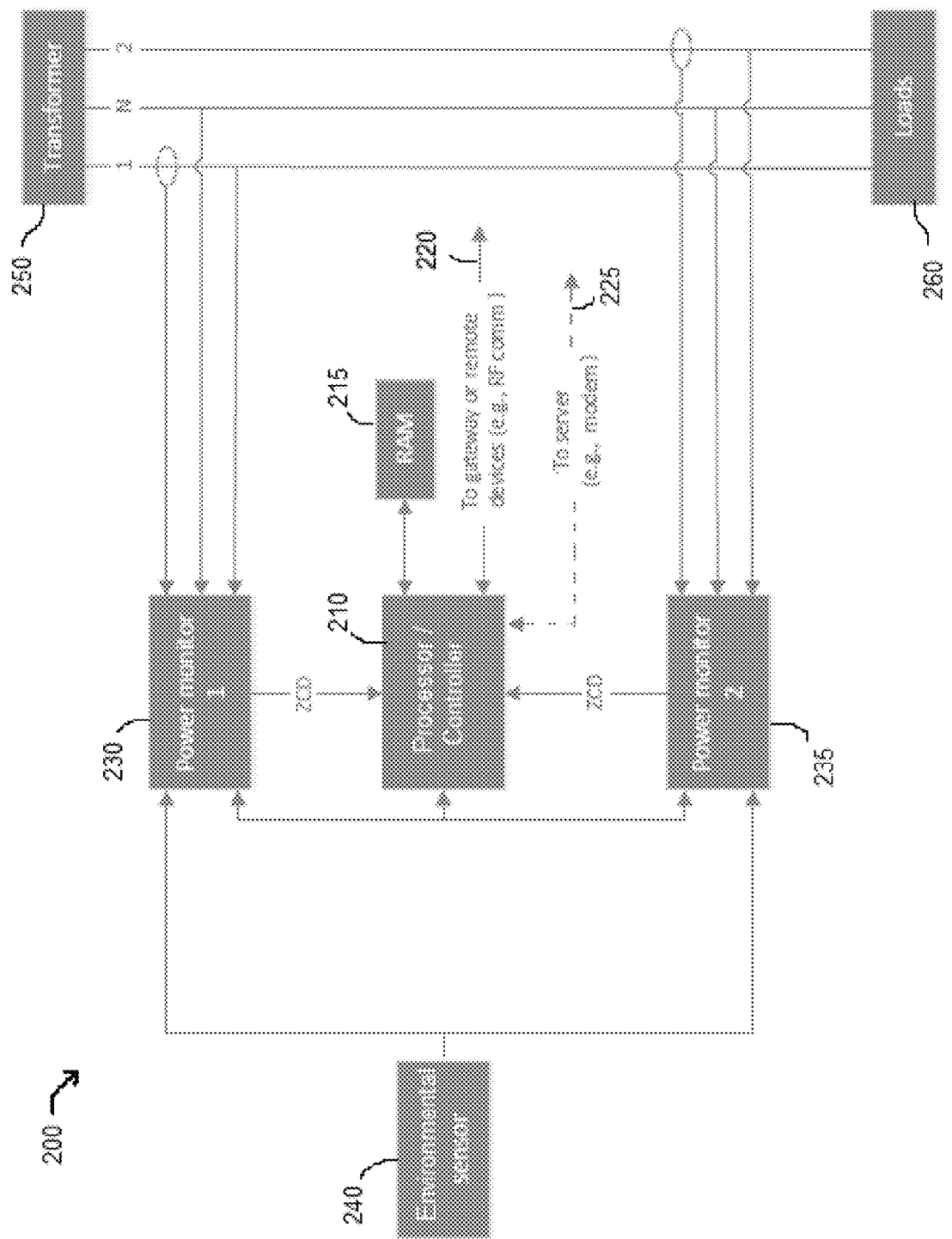
FIG. 2 illustrates an example simplified view of components of a device and their basic interconnects according to one or more embodiments herein, applicable to either the remote monitor devices or a gateway device.

FIG. 2 illustrates an example simplified view 200 of components and their basic interconnects, applicable to either the remote monitor devices or a gateway device. For instance, a processor/controller 210, such as a microcontroller, field-programmable gate array (FPGA), printed circuit board (PCB), single-board computer (SBC), etc. may have local memory storage (e.g., RAM) 215 (e.g., for general storage and/or data backup in case of a temporary communication failure), a wireless (e.g., radio frequency or "RF" connection) 220 to a gateway or remote devices, and for a gateway, a modem (e.g., 3G, LTE, etc.) connection 225 to a server or cloud-based storage and/or processing entity. Power monitor "1" (230) and power monitor "2" (235) may have one or more associated environmental sensors 240 (e.g., temperature, sunlight/irradiance, etc.), and may each be connected to a different phase (e.g., "1", "N", or "2" as shown, though A, B, C, and neutral are often used for three-phase systems) on transmission lines between a is transformer 250 and various loads 260. The power monitors may communicate with the processor 210 via inter-integrated circuit ($I^2C$) communication, or other communication mechanisms. The system 200 is based on built-in power supplies (e.g., self-powered from service lines) and communications so that it only requires connection to the phases, neutral, ground, and current transducers. Note that the zero crossing detection (ZCD) links shown from the power monitors may illustratively trigger a controller interrupt to indicate that new data is available from the power monitors.

In general, illustrative features of an example monitoring and control device in accordance with one or more embodiments described further herein may comprise:

Multi-phase measurement (e.g., sampling every one second or faster) of root-mean-square (RMS) current and RMS voltage (total and fundamental), total harmonic distortion, power (total and fundamental—real and reactive components), and frequency;

A powerful hybrid computing platform for real-time signal processing and high-level analytics: e.g., a field programmable gate array (FPGA) with one or more 160 MHz 32-bit soft-core processors (configurable) and a 1.5 GHz 64-bit quad core CPU (a 16-bit microcontroller is also capable of performing certain tasks required of a power monitoring device);

Hardware ready for waveform capture (e.g., 32 kHz internal sampling, up to 150 Mbps upload)

Support for Rogowski coil-based (air core) current transducers (CTs) and traditional CTs (iron core);

A modular hardware design with expansion slot for custom interfaces;

Provisions for over-the-air configuration and programming (e.g., an FPGA can receive settings, firmware, and even new configuration of logic elements over a wireless connection);

A back-up power supply (e.g., supercapacitor-based) to allow recording is grid blackout events (e.g., writing consistently to RAM, and then converting to NVRAM once the power is out, thus conserving the number of writes to an NVRAM);

Data retention and timestamping at multiple levels (device, gateway, and server) to mitigate intermittent communications, with an automatic upload when communications are restored;

Internal antennas and other considerations for weather proofing;

Global Positioning Satellite (GPS) antennas and processing for determining location of the devices and for time synchronization; and Other additional features described below.

In particular, the platform herein provides the opportunity for many advanced features to be added in the future. Power measurements are based on an integrated circuit with advanced power quality metrics and event triggering available based on fast internal sampling (e.g., 32 kHz). The gateway is capable of 5 Mbps upload, which could provide high-resolution data streaming (e.g., 128 samples per line cycle) on demand. Illustratively, a monitoring device may contain a microcontroller (as processor 210) with the capability for digital signal processing (DSP) and low-latency controls; the gateway, on the other hand, may contain (as processor 210) a high-performance single board computer (e.g., quad-core 64-bit ARM) that could host many additional functions including modeling and controls. Each device contains a GPS module (shown below) with the potential to enable precisely synchronized system-wide measurement (e.g., down to 20 ns) and Phase Measurement Unit (PMU) features. An on-board flash memory (e.g., 128

MB, four days of data) and backup power supply (e.g., 20 s) could be used for data retention and logging during grid dropout.

Note that a digital filter may be configured to identify the fundamental components of the voltage and current measurements (e.g., the fundamental line frequency), such as a finite impulse response (FIR) and infinite impulse response (IIR). The general qualities of a digital filter are a lowpass filter with a cutoff frequency of 80 Hz, a filter order ≤13 due to computational limits, and a sampling rate of either 8 kS/s or 128 samples per line cycle. Notably, the IIR filter achieves the required filter performance with a lower order than the FIR filter.

Figure 3:
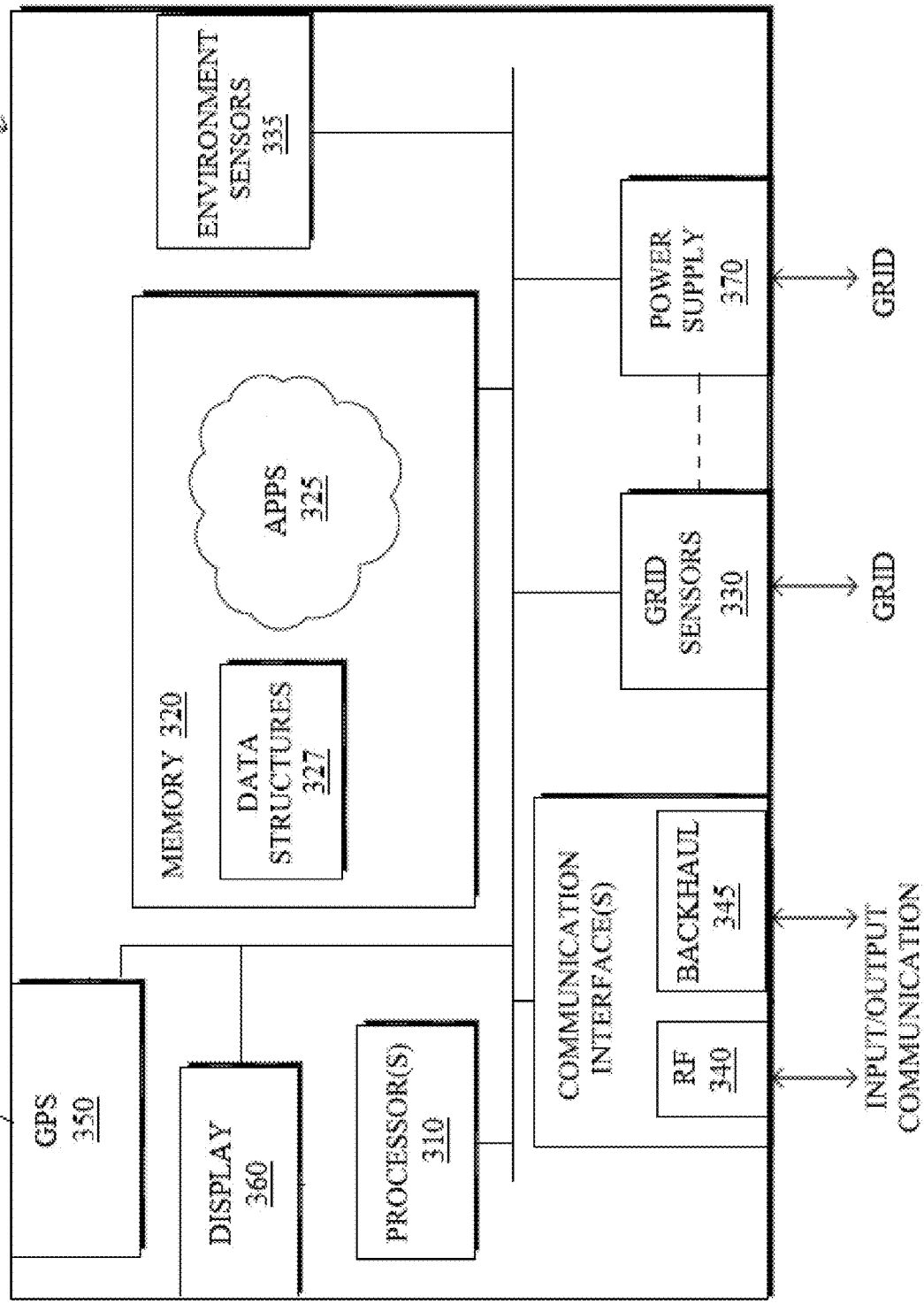
FIG. 3 illustrates an example simplified schematic view of a device that may be used with one or more embodiments described herein.

FIG. 3 illustrates an example simplified schematic view of a device 300 that may be used with one or more embodiments described herein, e.g., as any of the computing devices mentioned herein, particularly a remote monitor device or a gateway device, or any other related computing and/or communication device that supports the operations of the techniques herein (e.g., servers, etc.). The simplified device 300 may comprise hardware, software, and/or firmware to perform the following functionality, as will be appreciated by those skilled in the art, and connectivity between functions may be wired or wireless, accordingly. For instance, a device 300 may comprise one or more processors 310 (e.g., microprocessor, microcontroller, FGPA, etc.) configured to perform one or more processes or applications (apps) 325 stored in a memory 320 of the device based on or more data structures 327 (shared between apps or individually associated with the apps), where the memory 320 itself may comprise portions of volatile and non-volatile memory. One or more grid-based sensors 330 and environmental sensors 335 may also be located on the device, or otherwise associated with the device (e.g., in communicative relationship with the device), as described in greater detail herein. Communication modules, such as a wireless RF module 340 (on all devices) and a backhaul network interface 345 (e.g., 3G/4G-LTE cellular modem, satellite, etc.) on gateway devices or servers. The communication interfaces may be configured to transmit and/or receive data using a variety of different wired and wireless communication protocols, such as Wi-Fi, Universal Asynchronous Receiver/Transmitter (UART), serial peripheral interface (SPI), and so on. According to one or more embodiments herein, a GPS receiver 350 may also communicate with the processor 310, as well as other interfaces such as a display 360 (e.g., liquid crystal display, LCD) or other user-interfaces (e.g., indicator lights, etc.). A power supply 370 may comprise an interface to grid power for primary power, and a backup power supply for continued activity during power is outages (e.g., battery, super-capacitor, etc.).

It will be apparent to those skilled in the art that other processor and memory types, including various computer-readable media, may be used to store and execute program instructions pertaining to the techniques described herein (e.g., other forms of microprocessors, EEPROMs, etc.). Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 4:
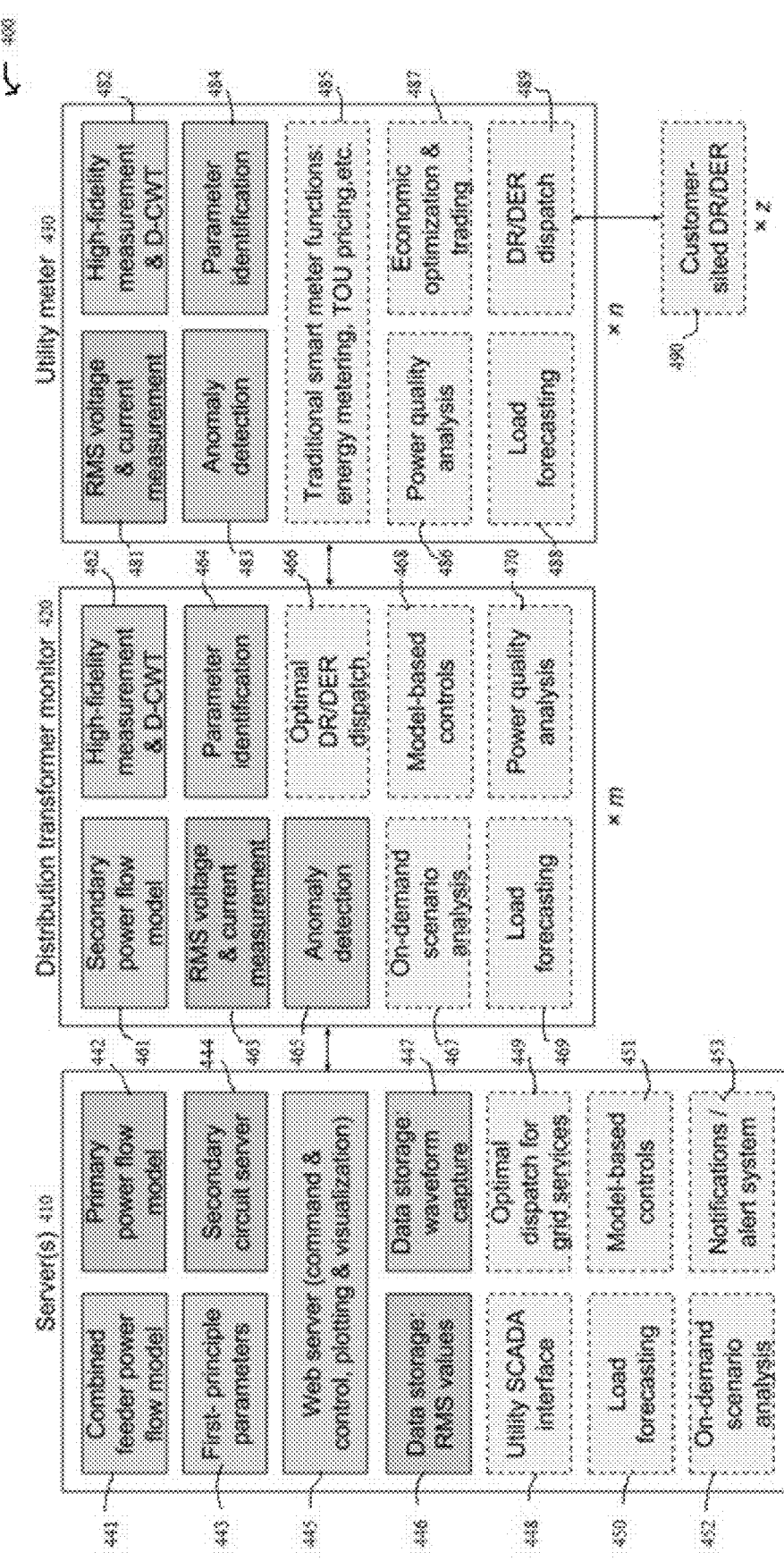
FIG. 4 illustrates an example functional view of example operations herein and how system functions are split among a server, distribution transformer monitor (DTM), and utility meter.

FIG. 4 illustrates another functional view 400 of example operations herein and how system functions are split among the server 410, distribution transformer monitor (DTM) 420, and utility meter 430. (The proposed utility meter functionality is a subset of the DTM functionality, and a DTM may be installed near a customer's existing utility meter rather than replacing it with an integrated unit. However, in either embodiment, a customer-sited DTM can be referred to herein as a utility meter.) In particular, the functionality described herein (or else generally understood in the art if not specifically described herein) may comprise the following, located illustratively on each type of device as shown:

Server 410:
combined feeder power flow model 441;
primary power flow model 442;
first-principle parameters 443;
secondary circuit server 444;
web server (command and control, plotting and visualization) 445;
data storage: RMS values 446;
data storage: waveform capture 447;
utility SCADA interface 448;
optimal dispatch for grid services 449;
load forecasting 450;
model-based controls 451;
on-demand scenario analysis 452; and
notifications/alert system 453.

DTM 420 (e.g., any number "m" of them):
secondary power flow model 461;
high-fidelity measurement and harmonic analysis (e.g., Fast Fourier Transform (FFT) or discretized continuous wavelet transform (D-CWT)) 462;
RMS voltage and current measurement 463;
parameter identification 464;
anomaly detection 465;
optimal DR/DER dispatch 466;
on-demand scenario analysis 467;
model-based controls 468;
load forecasting 469; and
power quality analysis 470.

Utility meter 430 (e.g., any number "n" of them):
RMS voltage and current measurement 481;
high-fidelity measurement and D-CWT 482;
anomaly detection 483;
parameter identification 484;
traditional smart meter functions (e.g., energy metering, TOU pricing, etc.) 485;
power quality analysis 486;
economic optimization and trading 487;
load forecasting 488; and
DR/DER dispatch 489.

Note also that FIG. 4 illustrates the customer-sited DR/DER devices 490, as well (e.g., any number "z" of them).

In one embodiment, the power monitors herein (e.g., device 300, DTM 420, utility meter 430) may be installed primarily at service transformers because the service transformer is a key nodal point on the grid since it aggregates the load of several utility customers, yet is close to the edge of the grid where it can provide or support high fidelity controls via demand response. Due to the aggregation described herein, it can potentially cover the utility's service area at a lower cost than smart meters, yet it can complement smart meters by providing a communication gateway and receiving data from those meters at the very edge of the grid. The service transformer offers relatively easy access and low voltages that can be monitored with low-cost electronics. Also, service transformers are typically mounted on utility poles which provide good elevation for RF transmission. The transformer itself is a key piece of utility equipment that is prone to failure, and in fact other commercial products have focused on detecting transformer anomalies without providing the full capabilities required for distribution system operations, controls, and analysis with high penetrations of DER.

In general, the techniques herein may be based on wireless mesh networking between the sensor devices in order to allow for overall transmission cost savings as well as to provide for distributed computing techniques as described herein. In particular, gateway devices need a backhaul data plan to contact the server(s), such as a 3G or 4G/LTE cellular plan. However, by allowing the remote sensors to communicate over a mesh network (e.g., 2.4 GHz WiFi and/or 900 MHz mesh networking), multiple devices (e.g., 10-20) can thus use the same data plan (i.e., the remote devices relay their readings through the RF module to the gateway). Typical mesh network technologies would still allow for low latency communication (<250 ms typical, including communication to server), and ample bandwidth for data transmission. Additionally, there are a wide range of options to route data between the devices (e.g., other remote sensor devices, consumer smart devices, etc.), such as with the Advanced Message Queuing Protocol.

Figure 5:
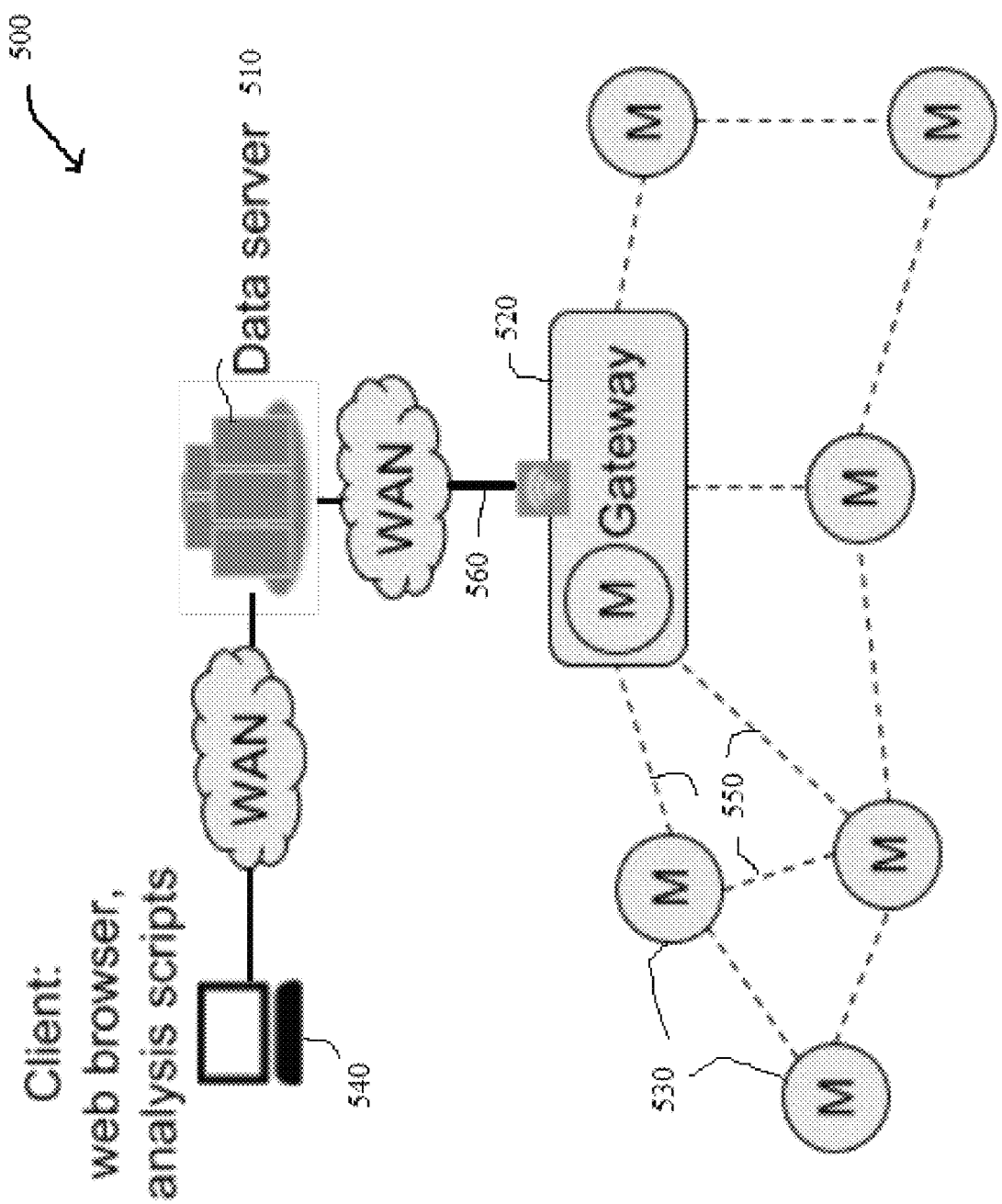
FIG. 5 illustrates an example simplified communication network according to the techniques herein.

FIG. 5, in particular, is an example of a simplified communication network 500 according to the techniques herein. As shown, the network 500 consists of one or more data servers 510, one or more gateways 520, a plurality of monitoring devices "M" 530, and one or more client devices 540. According to the techniques herein, as mentioned above, each device M's data may be transmitted over the mesh connections 550 to other power monitors (M devices 530) in the mesh and finally to the gateway 520, which has a modem with a backhaul network connection 560 (e.g., a commercial LTE wireless data plan). The range of a single wireless hop, past dense buildings and trees, is typically viable up to at least 200 m, and as such, is well-suited for pole-mounted service transformers. Hopping of nodes (M-to-M communication) also extends the range of the network beyond merely monitoring devices that can directly communicate with the gateway 520. Also, the wireless mesh may be secured with 128-bit AES (Advanced Encryption Standard) encryption and may be self-configuring and self-healing for ease of use and robustness, as may be appreciated by those skilled in the art of mesh networking.

The gateway 520 gathers data from devices on the wireless mesh as well as its own power monitor. It streams the data using an open-source message queue software to a server 510, which stores the data (e.g., in a MySQL database) and provides it to clients 540, such as via a web plotting interface as described below. Note that with proper credentials, external devices can also access the raw data stream, such as for low-latency controls.

Note also that built-in communications of the monitor devices 530 need not be limited to 2.4 GHz WiFi and 900 MHz mesh networking, but may, in certain configurations and cost structures, be able to communicate using integrated LTE system-on-package (SOP) hardware that can offer high-speed commercial data communications when deployed to individual pole-top locations, further enabling many features that would benefit from near real-time reporting of raw voltage and current waveforms.

According to one or more embodiments of the techniques herein, the mesh network configuration allows for distributed intelligence (e.g., pre-processing and/or filtering of data) and distributed modeling, collecting and creating an overall view of the power grid (including estimations for gaps in coverage where meters are not present or where existing meters are down due to power outages), as described further below.

——Impedance Estimation——

Impedance detection schemes have been studied in the literature to prevent "islands" or self-supporting sections of a circuit. These islands may appear and persist if loads and distributed generation are balanced when circuit breakers are opened, presenting a potential safety concern. Grid impedance identification involves observing and performing calculations on the grid's response to changes in current or power. There are two categories of grid impedance identification: passive and active. Active methods inject a disturbance into the grid while passive methods rely on existing, irregular grid activity.

Among the active inverter-based islanding detection schemes, there are multiple approaches based on impedance detection, frequency shift, and voltage shift. These all rely on the grid to maintain nominal conditions when perturbed by the inverter. For example, a first approach to detecting islands is to periodically increase or decrease the current injected by the inverter at the line frequency to a level that will trigger under or overvoltage protection (UVP/OVP) if the full grid connection is not present. This method requires large current transients that can introduce voltage flicker and grid instability, so it is not used in practice. A second active approach involves determining the impedance of the line connection by measuring the voltage response to current injected at harmonic or interharmonic frequencies. Since this approach modulates at a frequency separate from the line frequency and also performs demodulation and detection separate from the UVP/OVP limits, the sensitivity is higher and thus lower magnitudes of current injection are required, lowering the risk of voltage flicker and grid instability. However, with both of the active inverter-based impedance based techniques, there are concerns with interference and the averaging effects of multiple inverters employing the methods at once. This can be alleviated by injecting the currents over shorter periods of time to minimize the chance of conflicts or by synchronizing the inverters.

Other active methods include applying a short circuit, injecting prescribed small signal currents, and curtailing active power from DER. The prescribed current can be an impulse, harmonics, interharmonics, low frequency signals, wide spectrum signals, pseudo-random excitation of pulse width modulation (PWM), or precisely coordinated continuous signals from a double phase-lock amplifier. Active methods need not wait for a significant grid event, but they require a controllable current source—either a new device or the ability to control existing power electronic devices such as inverters. There are also methods that employ filters (e.g., LCL) to produce a resonance from existing power transients. Although they use passive components, these methods do have a measurable effect on the grid. Active and pseudo-passive methods will generally be more expensive to implement than fully passive ones due to hardware and interfacing requirements. They also may raise concerns about their effects on power quality or, in some cases, their need to curtail active power to inject disturbances.

The passive impedance detection methods, on the other hand, all use some means of measuring voltage response to existing real and reactive current or power, typically over a long period of time. One method, for example, performs online least squares regression of voltage versus real and reactive current, resulting in a continuously updated Thevenin equivalent impedance at the point of connection (POC).

Another method notes that there are often correlations among smart meter data, particularly to identify phasing and impedance. (Note, for phasing detection, the correlation of total harmonic distortion is much more effective than the correlation of voltage.) This method uses a least squares fit of voltage versus power to estimate impedances, but smart meter data is typically insufficient for this calculation. Still another method is to iteratively build a grid model is in segments by inferring phasing, topology, and impedance from voltage correlations of smart meter data.

Another passive approach of interest is the use of microphasor measurement units (µPMUs), which rely on phase differences across a circuit due to reactances. It is possible to measure these phase differences across distribution circuits, but extremely high accuracies (down to 0.01°) are necessary due to the very small time delays. While the costs of µRMUs will probably decrease, there will likely always be a cost premium over approaches that measure model parameters via more prominent effects more closely aligned with those that are modeled. The µRMU approach also does not utilize present and available harmonic information via low-cost measurement technology and, in fact, considers it noise.

Notably, the time requirements for islanding detection are much more stringent than for methods of impedance detection used to enhance voltage regulation, reactive power compensation, and other ancillary services. The standards from the Institute of Electrical and Electronic Engineers (IEEE) state that non-islanding inverters should de-energize within 10 cycles (<200 ms) in the case of severe mismatches and 2.5 s in other cases. In contrast, the impedance of the circuit segments under normal conditions, aside from any faults, only change when the circuit is rewired or updated, or slowly over time with component aging—corresponding to time constraints on the order of months or years, not seconds. With these relaxed constraints, more options become available for the impedance detection.

Current techniques, however, do not provide any type of measurement system to determine the impedances of all individual circuit segments at once (as in the techniques described below). In particular, one consideration is that the perturbations from the active inverter must pass through the service transformer in order to measure the impedance of the medium voltage (MV) distribution line. The attenuating effect of service transformers has been studied extensively in the literature for power line communications (PLC). The conclusion is that transformers generally act as low pass filters with cutoff frequency in the 60-700 Hz range. Although the transformers do is selectively pass some high frequencies, these frequencies vary due to manufacturing variances; therefore the transmission must be adaptively tuned or modulated over a wide spectrum.

According to one or more embodiments herein, the distribution transformer power monitor described above (i.e., with power quality metrics, onboard digital signal processing (DSP), wireless mesh networking, data streaming, GPS-referenced clock, and adequate processor (FPGA, single board computer, etc.), provides the platform for the impedance modeling and analysis described below. In particular, the techniques herein specifically contemplate two methods for estimating impedance: active and passive. Both are based on the facts that harmonics occur across the grid when events (e.g., disturbances) happen on the grid. By determining various attenuation metrics from the source of the event to a particular monitor, or else the difference between a detected event at one monitor to another monitor, the techniques herein can determine estimated impedances, accordingly.

According to active technique embodiments herein, existing DPV inverters may be leveraged to actively measure the impedance of individual distribution circuit segments at line frequency. The objectives of such a system are: (1) to inject real and reactive power in a manner that allows circuit response to be adequately distinguished from noise, (2) to map the circuit response to the impedance of individual circuit segments, (3) to avoid detrimental effects such as voltage flicker and grid instability, and, optionally, (4) to identify the active inverter by encoding additional information into the injected power.

Figure 6:
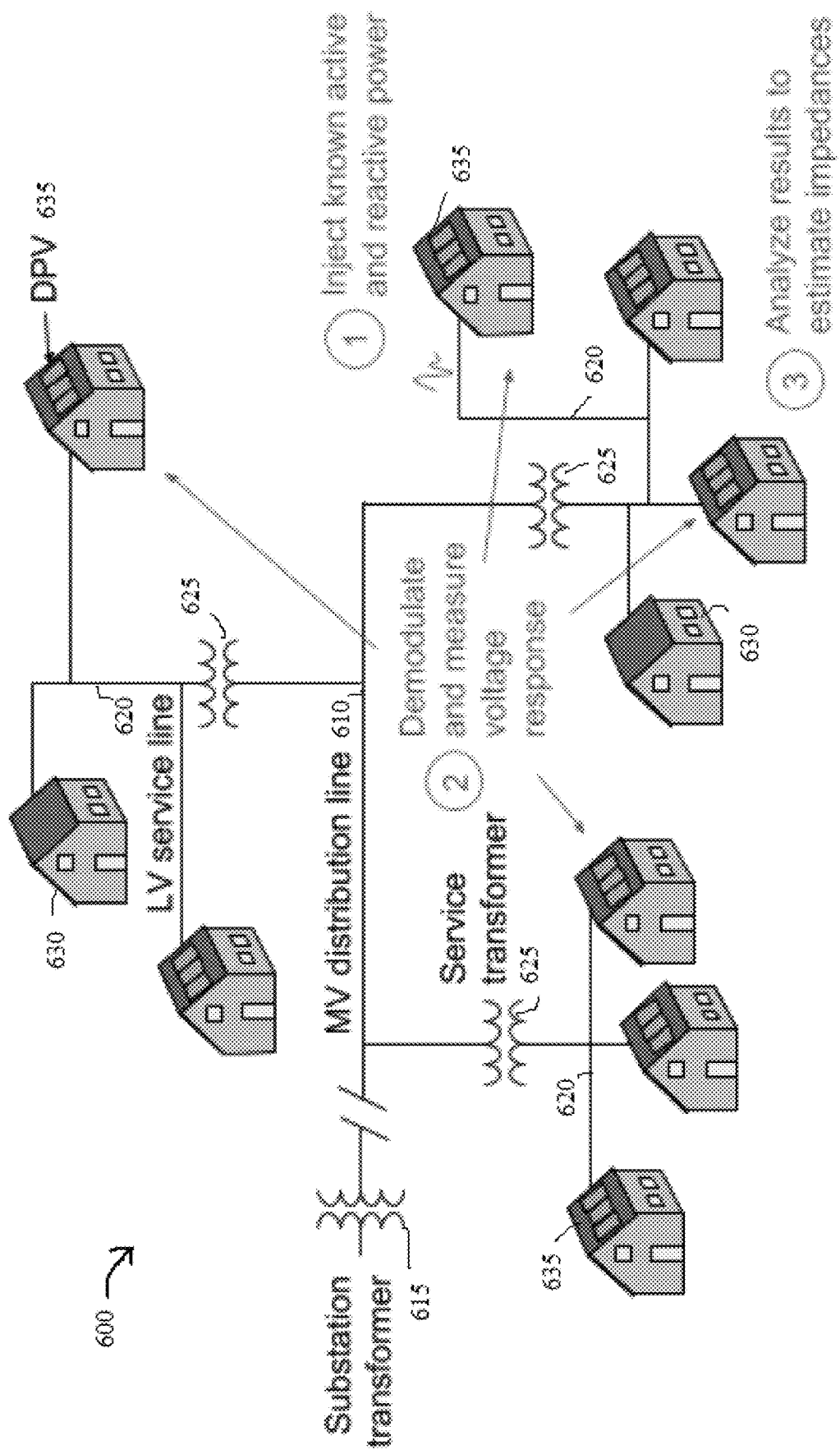
FIG. 6 illustrates an example simplified grid environment, with a proposed active impedance detection system.

FIG. 6, in particular, shows a simplified grid environment 600, where the proposed active impedance detection system operates within a distribution circuit (with MV distribution lines 610 from a substation transformer 615, LV service lines 620 from service transformers 625, and homes 630 with certain homes having DPV inverters 635). One inverter ("1") modulates its output to inject real and reactive current, and numerous measurement devices (shown generally as "2")—including the active inverter, other inverters, and possibly dedicated power monitors—demodulate the result to measure the voltage response of the circuit. The ratio of the voltage change to the injected current indicates the impedance between the active inverter and the measurement devices, in series with the impedance to the rest of the grid. The measurement process is repeated by selecting other inverters as the active inverter. Finally, the resulting data from all of the measurements is used to determine the impedances of individual circuit segments (e.g., by an associated server or distributed process, generally shown as "3").

The carrier for the current modulation may be specifically selected as the line frequency itself in order to avoid transformer attenuation. This also avoids the need to translate the measured impedance to the impedance at the line frequency. In one embodiment, the current can be modulated by applying a direct-sequence spread spectrum (DSSS) algorithm to repeatedly switch between positive, negative, and zero small signal levels of additional real and reactive current using a pseudonoise (PN) sequence. In addition to improving the signal-to-noise ratio (SNR) of the transmission from the active inverter to the measurement devices, the PN sequence may also be used to identify the active inverter. It also prevents direct interference even if two inverters inadvertently transmit simultaneously. Since a measurement every month is sufficient, a single transmission could last up to an hour and still allow 200 inverters to transmit during daylight hours while the inverters have DC power. (An inverter can take up to five seconds to change its power level in response to a command—assuming each power level is held for ten seconds, a transmission sequence could include up to 240 transitions.)

Figure 7:
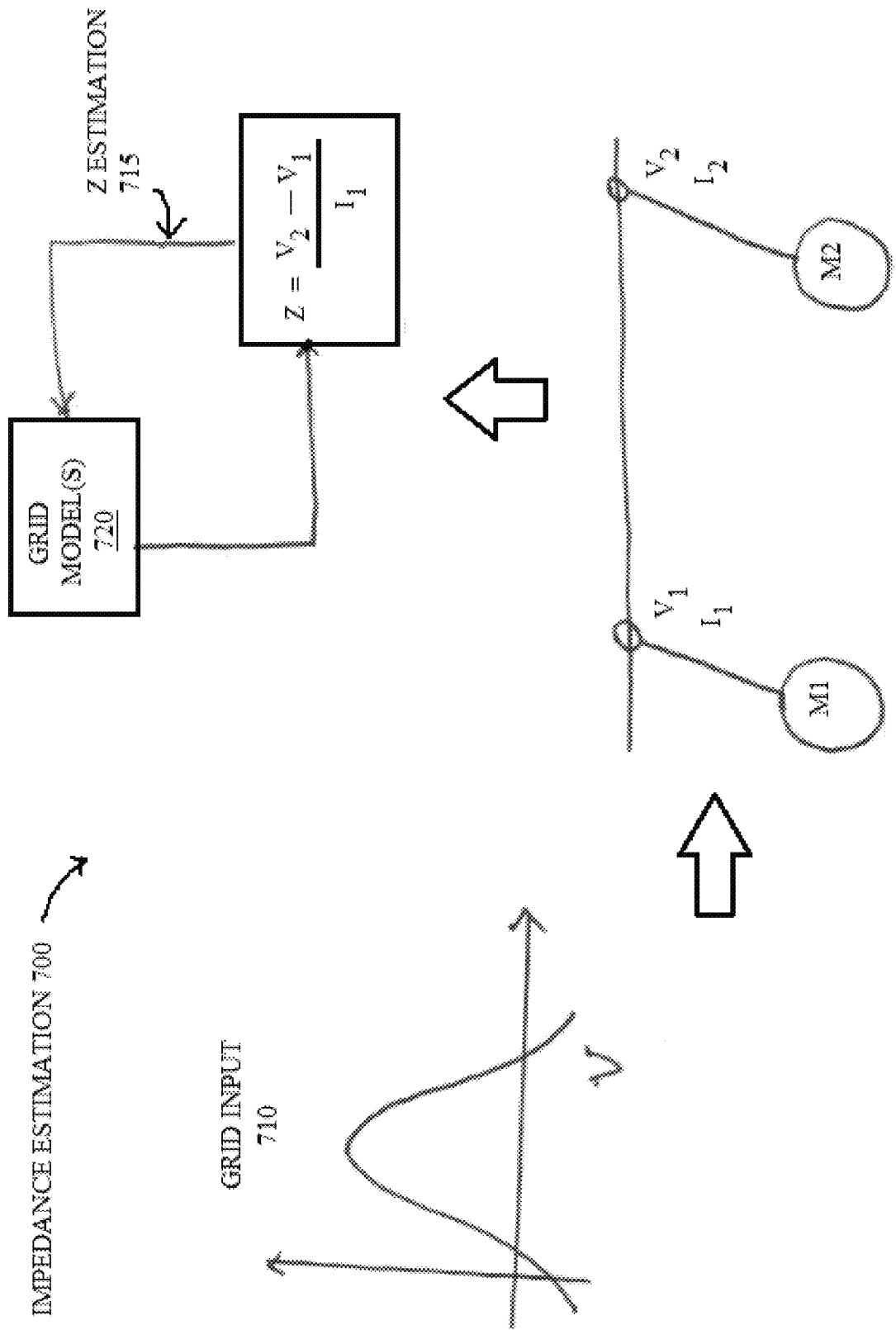
FIG. 7 illustrates an example simplified computation environment according to a passive impedance detection technique herein.

On the other hand, according to passive technique embodiments herein, with general reference to the simplified computation 700 of FIG. 7, by comparing the voltage and current (active and reactive) of grid input 710 among meters at multiple locations on the distribution circuit (e.g., M1 and M2) and accounting the voltage drop across the distribution transformers, the system can calculate (Z estimation 715) the real and imaginary parts of the impedance across the medium-voltage distribution lines. These impedance estimations can be improved over time using optimization algorithms for parameter identification (i.e., detectable events) using grid models 720.

In particular, real-time and predictive modeling is essential for such a platform, and its scalability (and cost) can be improved by (1) applying a unique matrix-free approach to simulate the grid across processors distributed both laterally (co-located with sensors at service transformers) and hierarchically (at the feeder level in conjunction with the service level) and (2) using a time-synchronized wavelet transform (WT)-based technique to passively identify electrical parameters by isolating harmonic information of transient load events (e.g., a Fast Fourier Transform (FFT) technique or discretized continuous wavelet transform (D-CWT) technique to detect electrical parameters) and grid topology in order to supply the models. Such a scalable device has the potential to revolutionize electric distribution by enabling truly smart distributed energy resource management systems (DERMS) and distribution system operations (DSO) that can provide enhanced services such as voltage optimization, optimal power flow, high-speed distributed energy and grid services markets, and the detection of distribution grid anomalies (e.g., transformer failures or cyber-attack).

Figure 8A:
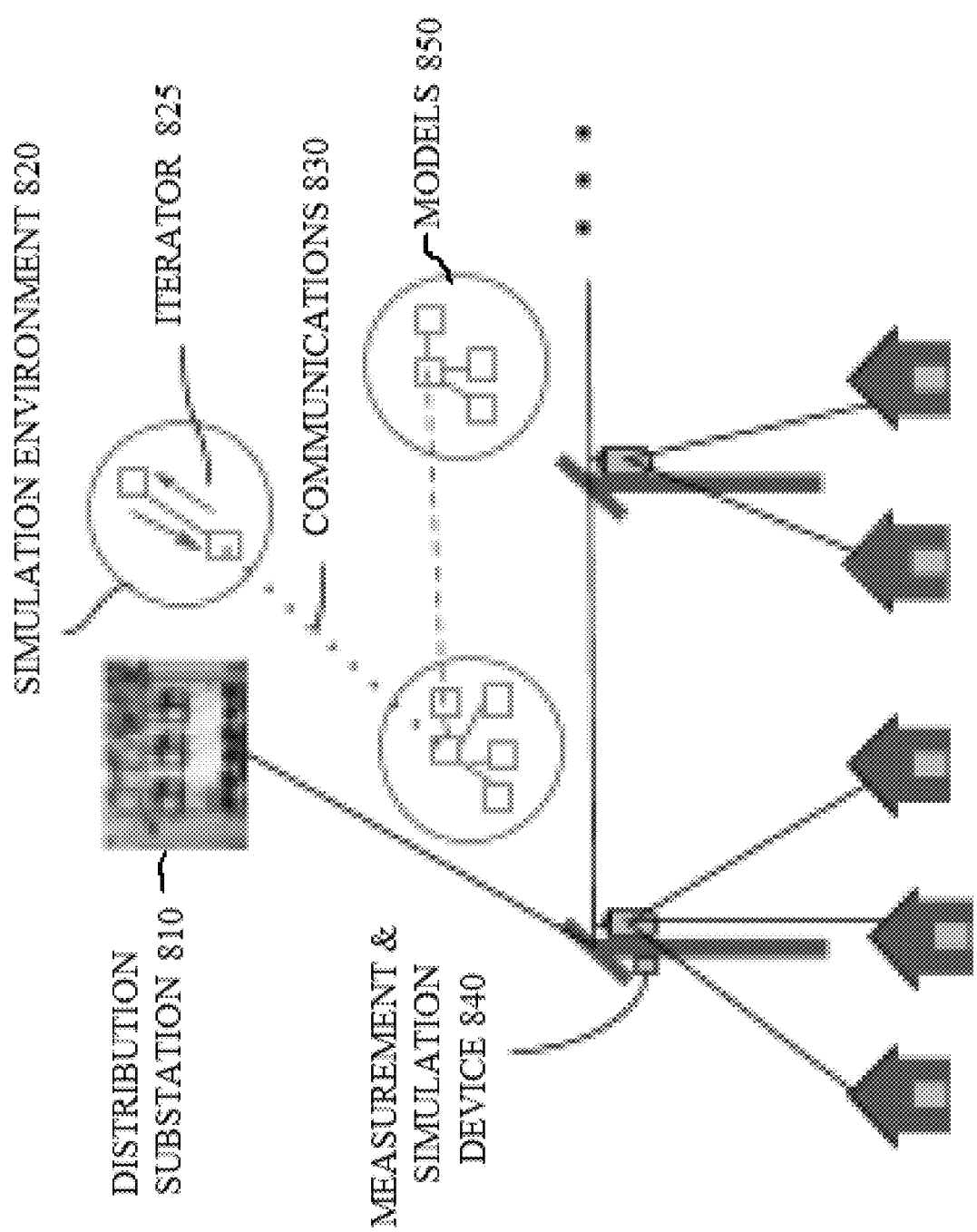
FIG. 8A illustrates an example of tuning model parameters for Graph Trace Analysis (GTA)-based simulations.

Specifically, according to one or more embodiments herein, in order to automatically detect electrical parameters and grid topology for the models, two techniques may be employed. The first is to use feedback loops to tune model parameters by reducing error between embedded power flow models as solved by a distributed algorithm such as Graph Trace Analysis (GTA) and available measurements as shown in FIG. 8A, where, as described further below, an iterator 825 of a simulation environment 820 (of a distribution substation 810) iterates and communicates models 850 over communication links 830 to measurement and simulation devices 840 (monitor devices above). The second technique, illustrated with reference to FIG. 8B, utilizes nearby distribution transformer power monitors 840 to periodically perform and compare time-synchronized Fast Fourier Transforms (FFTs) 860 consisting of line frequency-synchronized samples of secondary voltage (e.g., based on a GPS time reference 870) in order to evaluate impedances of voltage transients 880 at the fundamental frequency as well as harmonics. Candidate grid models will be fitted to these results in order to determine the most likely topology and parameters. The techniques may be enhanced by commanding changes in PV inverter setpoints to verify model results and provide known grid perturbations for FFT analysis.

Figure 8B:
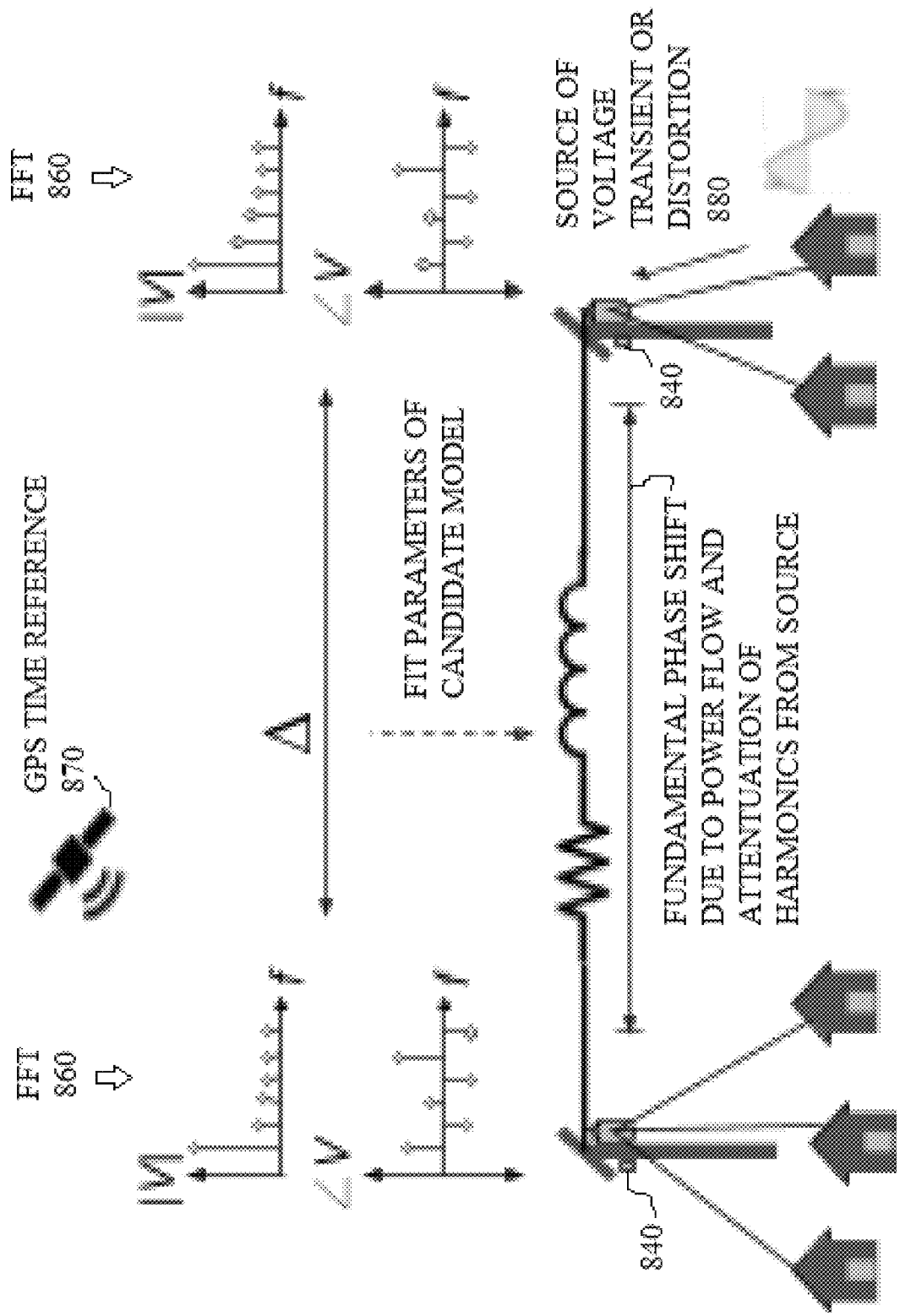
FIG. 8B illustrates an example of performing a wavelet transform (WT)-based technique to passively identify electrical parameters by isolating harmonic information of transient load events.
Figure 9:
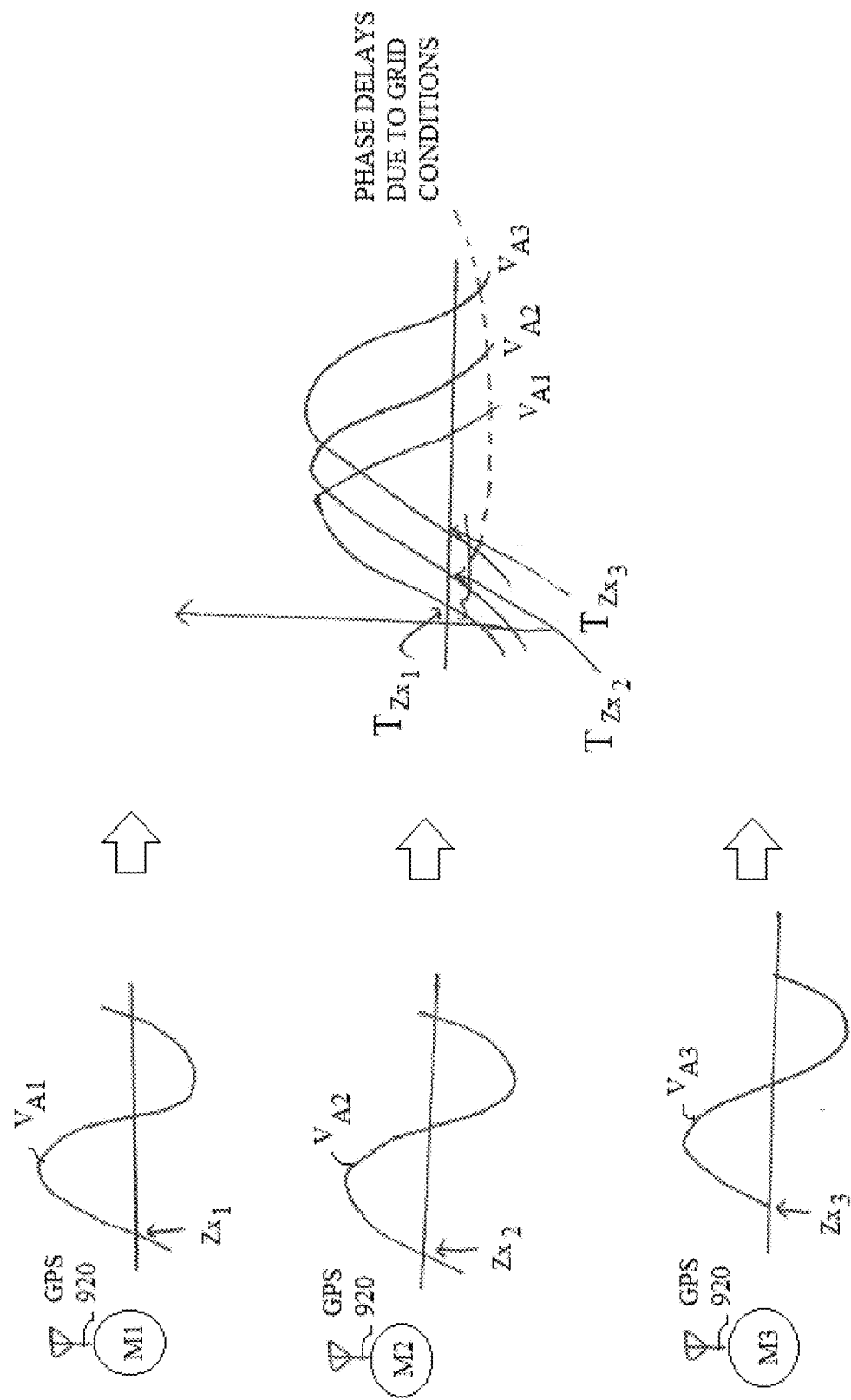
FIG. 9 illustrates an example phase shift detector using GPS.

In order to implement a distributed parameter identification system, the techniques herein may utilize GPS time references 870 to align high-resolution voltage and current measurements across the grid, as shown in FIG. 8B above. FIG. 9 illustrates the concept (phase shift detector 900) of using GPS for phase shift detection according to certain embodiments herein. In particular, using precise global timing signals from its built-in global positioning system (GPS) unit 920, each device (e.g., M1-M3) can determine the time at which zero crossing (Zx) events occur in the voltage for each phase measured by the device (e.g., $V_A$). These zero crossing times (TZx) can be compared among multiple devices and locations for phase shift detection across the distribution circuit. This is a "lightweight" and low-cost version of widely accepted devices called micro syncrophasors or micro phase measurement units (microPMU), which provide much greater detail than is necessary (e.g., providing phase-locked-loop, 0.001-degree of phase angle of V, nano-second precision) for correlating zero crossings and synchronizing samples across the distribution grid.

As noted above, the solution herein is a distributed modeling, data acquisition, modeling, and analytics platform built on measurement and computing devices at distribution transformers and customer POCs. The solution involves (1) an advanced matrix-free harmonic power flow solver and (2) passive, automatic parameter identification using time-synchronized wide-spectrum harmonic information from field measurements (e.g., wavelet transforms (WTs)-based parameter identification).

In order to distribute models and simulations across the distribution grid, the techniques herein apply GTA as shown in the distributed modeling of FIG. 8A above. Specifically, GTA is a unique matrix-free, object-oriented approach to power flow modeling that uses topology iterators to traverse components in a model and perform calculations. Traditional power flow solvers use equation substitutions to arrive at a system of n equations in n unknown independent variables, which are encoded as a is matrix and sent to a numerical solver. The matrix equation must be solved using either a single processor or specialized parallel processing computers. However, matrix-free solvers have recently become available that can be parallelized on general-purpose computers, such as GTA. According to the techniques herein, with the GTA-based power flow, no equation substitutions are used. Instead, Kirchoff laws are dynamically implemented with traces through the graph of the system and checked at every iteration of the power flow, resulting in a very robust solver. With remote GTA iterators, power flow calculations naturally distribute by distributing the model across multiple processors.

In particular, in GTA, the model manages object-oriented topology iterators and offers these iterators to algorithms to process through the edges of the graph, or components of the model. GTA allows (1) power flow calculations to be distributed across multiple processors and (2) system equations to be separated from component equations. The former will allow processors at distribution transformers and the feeder level to share the simulation work by interacting in a manner that mirrors the circuit topology. The latter will enable a flexible simulation environment where models of grid components such as transformers can be updated at simulation time, allowing for continual evolution of the model to match grid behavior According to the techniques herein, therefore, the monitor devices 840 continuously monitor the grid for unique transient events 880 that can be used as a disturbance in lieu of active current injection. When a suitable transient is detected, the techniques herein use wavelet transforms (WTs) (e.g., FFTs 860) to decompose the grid's response to these events into time-localized frequency components. These components and their changes are used to calculate impedances over a wide spectrum, from subharmonics (<60 Hz) to high-order harmonics (e.g., up to 32nd harmonic). Power line carrier studies have shown that wide frequency spectrum signals, even small in amplitude, can propagate across transformers, which makes it possible to measure impedances of the primary conductors in addition to the secondaries. This approach also allows measuring values for real and reactive harmonic loads, CVR load dependencies, is and transformer/load phasing.

The techniques herein thus merge power flow modeling, data acquisition, and signal processing capabilities onto devices that are distributed laterally and hierarchically over the grid. The embedded modeling approach has not yet been applied to a distributed field application and is unique even within the market for desktop-based power flow simulation. The WT approach to parameter identification is innovative because it combines the time-synchronized aspect of µPMUs, the rich harmonic information that has previously been limited to active impedance measurement, and the non-invasive nature of a passive device. It can be implemented on a low-cost power meter because its timing requirements are at least two orders of magnitude less than µPMUs designed for distribution grids and it does not require a phase locked loop or power electronics for disturbance injection. Due to the low cost, it should be economically feasible to deploy the method at multiple points on the distribution grid and calculate the impedance of different circuit segments and not just the Thevenin equivalent at a single POC.

In more detail, the embedded modeling approach comprises a secondary power flow model in the DTM which communicates with a primary power flow model in the server to create a combined feeder power flow model in the server. The topology and parameters for the secondary power flow models are stored in a secondary circuit server (SCS). The power flow models and the impedances in the SCS are harmonic—capable of simulation at the fundamental line frequency and its harmonics, interharmonics, or subharmonics, depending on configuration. That is, a centralized SCS will push secondary circuit models onto SBCs at the distribution transformers. Illustratively, there may be two sets of models due to two sets of parameters: those based on first principles and those identified from field measurements. Both sets of models will be harmonic, and their harmonic power flow solutions will be compared during field tests. A centralized harmonic power flow analysis of the feeder primary will be established and converged with the harmonic power flows running on the secondary circuits to create a combined distribution circuit harmonic power flow. Additionally, the harmonic power flow is analysis software will be ported to the SBCs. The SBC harmonic power flow analysis of the secondary circuits will receive harmonic, primary system voltages calculated by the centralized, harmonic power flow of the feeder primary. The SBC harmonic power flow analysis of the secondary circuits will return harmonic real and reactive loads (i.e., the harmonic loading seen at the low side of the distribution transformer) to the harmonic power flow analysis of the primary feeder. These harmonic power flow calculations with iterate until the change in primary system voltages and secondary system loads has become sufficiently small.

The parameter identification, on the other hand, comprises high-fidelity measurement and digital signal processing (DSP) on both the DTM and the utility meter. The measurements from multiple DTMs and utility meters are synchronized using GPS and compared to calculate grid impedances, as shown in FIG. 10, a signal block diagram for parameter identification from high-speed measurements.

Figure 10:
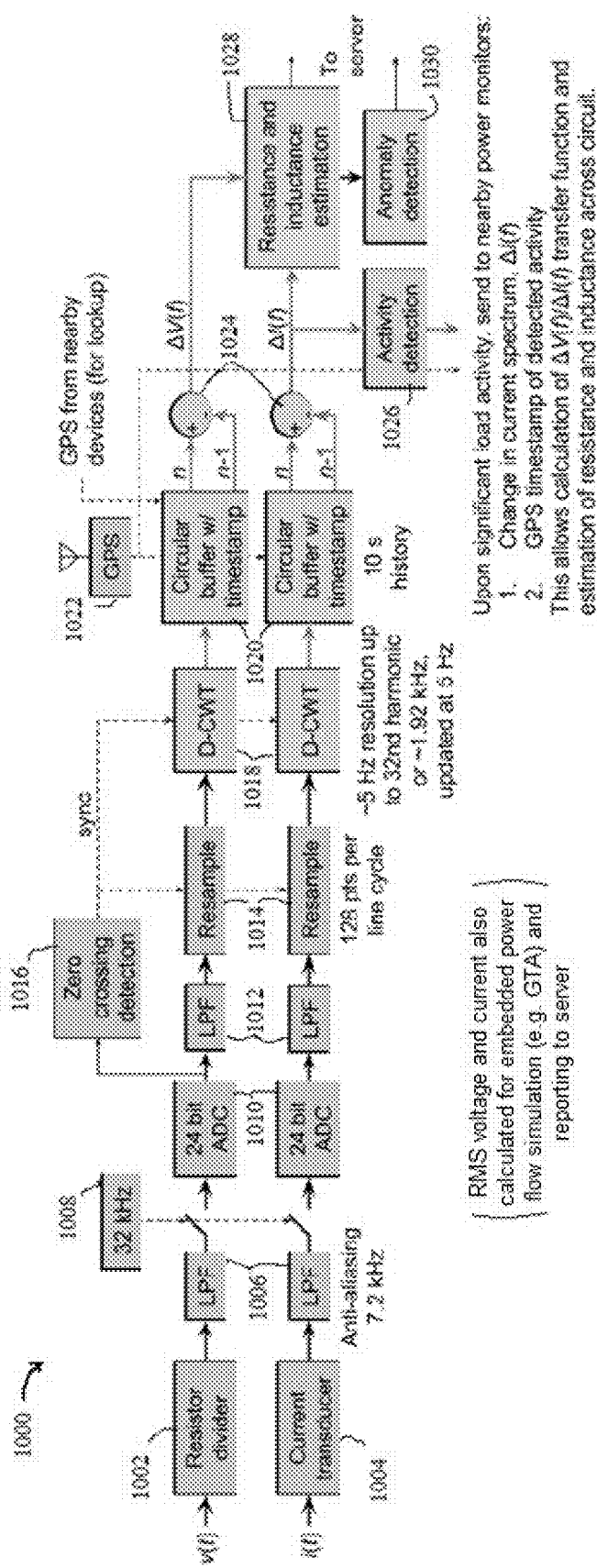
FIG. 10 illustrates an example signal block diagram for parameter identification from high-speed measurements.

In particular, as shown in FIG. 10, circuit 1000 processes voltage v(t) and current i(t) and comprises a resistor divider 1002 for the voltage and a current transducer 1004 for the current. From there, the outputs of these are passed through a respective low-pass filter (LPF) 1006 (e.g., anti-aliasing, 7.2 kHz), and sampled at an illustrative 32 kHz clock 1008 into a respective 24-bit analog-to-digital converter (ADC) 1010. Once further passed through respective LPFs 1012, the signals may be resampled (1014) based on zero crossing detection 1016 (e.g., 128 pts per line cycle), and passed to a respective discretized continuous wavelet transform (D-CWT) 1018 (e.g., approximately 5 Hz resolution up to 32nd harmonic, or about 1.92 kHz, updated at 5 Hz). A respective circular buffer (e.g., 10 second history) with timestamp 1020 (e.g., based on GPS 1022) may then receive the signal, putting it through a respective sum block 1024 to find the delta/change since the last sample. The current change can be input into an activity detection module 1026, where upon significant load activity, can be sent to nearby power monitors along with a GPS timestamp of the detected activity (to allow calculation of a transfer function and estimation of resistance and inductance across the circuit, as described herein). The change in current and voltage may also be sent to a resistance and is inductance estimation module 1028, which can be sent to a server and or through an anomaly detection module 1030, as may be appreciated by those skilled in the art.

Figure 11A:
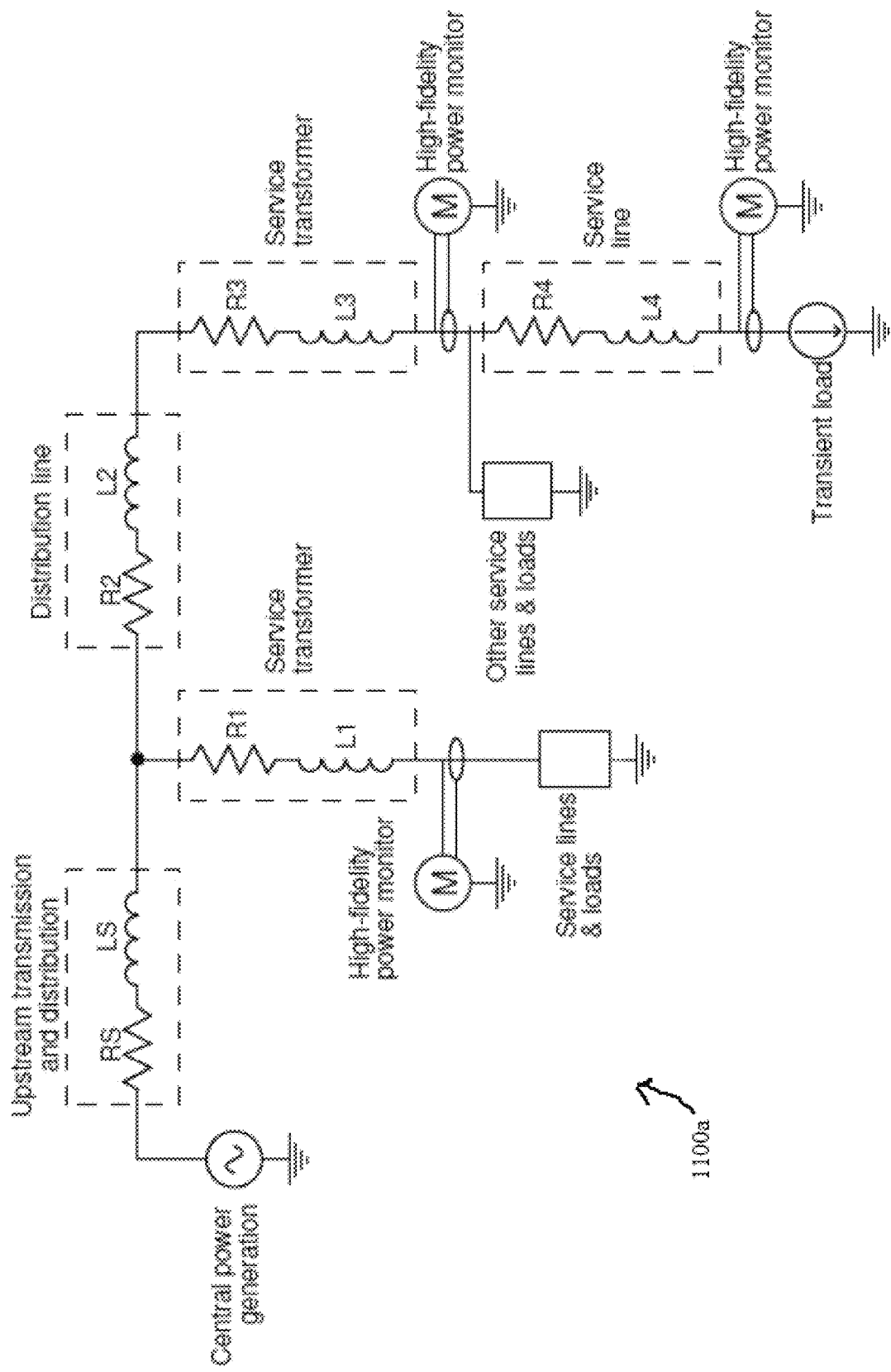
FIGS. 11A-11B illustrate an example of a simple distribution circuit to illustrate equations for parameter identification.
Figure 11B:
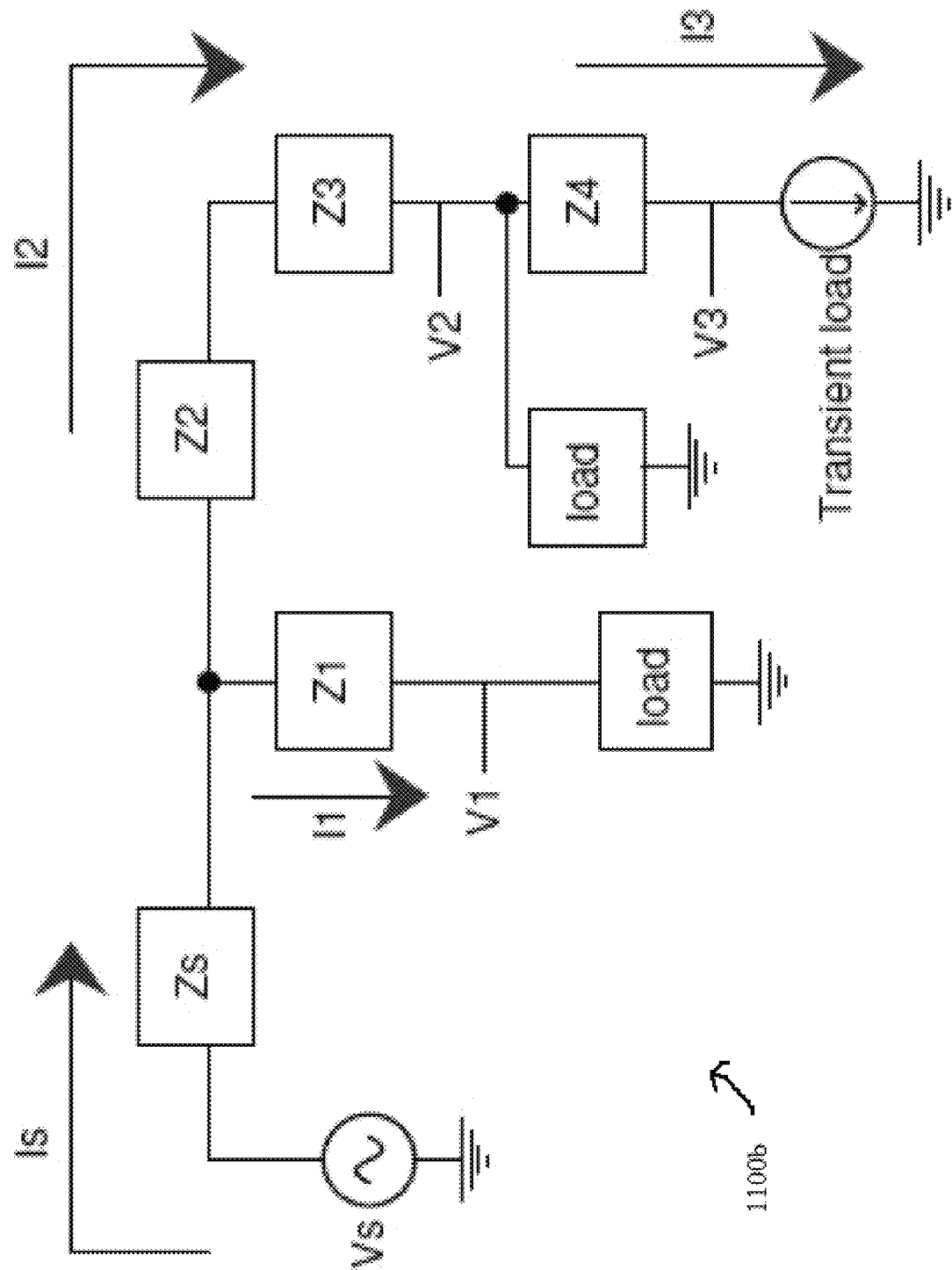

Furthermore, FIG. 11A shows a section of a simple distribution circuit 1100a to illustrate equations for parameter identification (e.g., a single phase equivalent circuit for measurement and signal propagation). This is an equivalent circuit where all resistances and inductances have been transformed to the secondary voltage. Therefore, the resistances and inductances are reduced from their physical values by a factor of $1/n^2 \approx 1/2500$, creating a much stiffer response as seen on the secondary. It is appropriate to represent the lines as resistances and inductances in series due to the negligible effect of line capacitance. In FIG. 11B (1100b) the resistors (RS, R1-R4) and inductors (LS, L1-L4) are combined as generic impedances (Z) for easier analysis. The power monitors measure voltage and calculate the frequency domain representations V1, V2, and V3. Likewise, current is measured and transformed to I1, I2, and I3.

First, to estimate the harmonic impedance of the service line represented by Z4, we use Ohm's law:

$$Z_4 = \frac{V_2 - V_3}{I_3}. \qquad \text{Eq. 1}$$

Next, we estimate the series impedance of Z2 and Z3 by identifying the upstream (towards the feeder head) effect the changing transient load has over time. We find a transient load event that causes branch current I2 to change by Δ I2 over a short period. This causes V2 to change by Δ V2 over the same period of time. Due to attenuation, V1 changes to a lesser extent by Δ V2. We assume the change in current is primarily served by the primary and thus the change to I1 is negligible (Δ I1<<Δ I2). The result of this analysis is the following:

$$Z_2 + Z_3 = \frac{\Delta V_1 - \Delta V_2}{\Delta I_2}. \qquad \text{Eq. 2}$$

One considerable challenge to parameter identification is the presence of other variations and noise on the grid. The techniques herein propose to use the following methods to improve the effective signal-to-noise ratio:

1. Continually monitor current and perform a discretized continuous wavelet transform (D-CWT) to identify large, unique transient load events on is which to trigger the parameter identification algorithm ("activity detection"). Data is buffered and time-stamped so calculations can be coordinated across devices soon after the trigger occurs.
2. Perform the impedance calculations over a wide spectrum (up to the 32nd harmonic), possibly including subharmonics and interharmonics, to evaluate and fit to the trends so no one frequency point dominates the measurement. In the fitting procedure, each frequency point may be weighted according to its power spectral density in order to minimize the impact of weak (and likely noisy) signals. This also allows reducing the harmonic impedances to lumped resistances and inductances, if desired.

3. Perform many measurements over the course of days and weeks in order to leverage the law of averages. Extreme variations in impedance are removed. This also allows the system to detect grid anomalies and notify utility operators of possible impending faults.
4. Use high precision analog-to-digital converters (e.g., 24-bit) with high-quality analog and digital filtering techniques and printed circuit board (PCB) design. Each voltage and current measurement has a dedicated ADC channel to eliminate alignment issues.
5. Synchronize measurements across devices precisely using GPS (e.g., within 100 µs).
6. In performing the frequency analysis, use data that has been resampled to multiples of the line frequency in order to reduce frequency leakage.
7. Use the D-CWT to improve the frequency and time localization as compared to a traditional fast Fourier transform (FFT).

Notably, the implementation of the embedded model and the parameter identification both require communication among devices and between devices and the server. Each device may either communicate via the mesh network configuration above, or will have a dedicated LTE Cat 4 modem and a commercial data plan. Average data requirements are expected to be on the order of 10 kbps—four orders of magnitude less than the LTE Cat 4 capability of 150 Mbps—but bursts of data may be transmitted during impedance calculations. Also, waveform capture will sometimes be desired for research purposes, which requires up to 10 Mbps for sustained operation.

——Grid Visibility——

The techniques herein provide high-resolution data acquisition from distribution service transformers. One primary objective of the system is to support the integration of high amounts of distributed photovoltaics (PV) and other resources onto the electric grid by providing real-time insight into the variable conditions introduced by these resources. Data is streamed continuously to a database and other devices as needed (including web browsers via website interfaces) using a flexible messaging framework with data backup at multiple stages. That is, the techniques herein further provide for various visibility interfaces for device status, interactive plotting/visualization, and application program interfaces (APIs).

Power monitoring results may be made available on the device's LCD, in an interactive web-based plotting tool, and in analysis code or spreadsheets using a JSON API. Examples of variables that may be logged, displayed, correlated, analyzed, and so on, may comprise direct variables (e.g., UTC time, Line frequency, Total RMS voltage*, Fundamental RMS voltage*, Total RMS current*, Fundamental RMS current*, Total real power*, Fundamental real power*, Fundamental reactive power*, Temperature of power monitor IC, Temperature of gateway CPU, etc.), and derived values through one or more APIs (e.g., THD (voltage)*, TDD (current)*, Total apparent power*, Fundamental apparent power*, Fundamental power factor*, Fundamental phase angle*, Total harmonic distortion of voltage*, Total harmonic distortion of current*, etc.) (where "*" is denotes a value for each phase). The sampling period is adjustable down to 0.1 s, or it can be based on line frequency down to a single cycle.

A web interface for inspecting parameter estimates, secondary circuit analysis results, and violations and/or problems may be configured according to the data provided by the monitor devices herein. Results may be inspected and include real and reactive harmonic loading estimates, harmonic impedance estimates, harmonic voltages, harmonic currents, PV generation estimates, conductor loading, and load-voltage dependency estimates. The percent harmonics with and without PV generation can also be determined and compared. Statistics on the change in the percent harmonics with the PV generation running can also be determined.

Operating limit violations and/or problems that can be reported include, among others, high voltages, excessive voltage drops, excessive loading, excessive harmonic distortion, high impedance connections, loose connections (e.g., the impedance will vary over time from an expected range of impedance values to a high impedance value), and so on.

Figure 12:
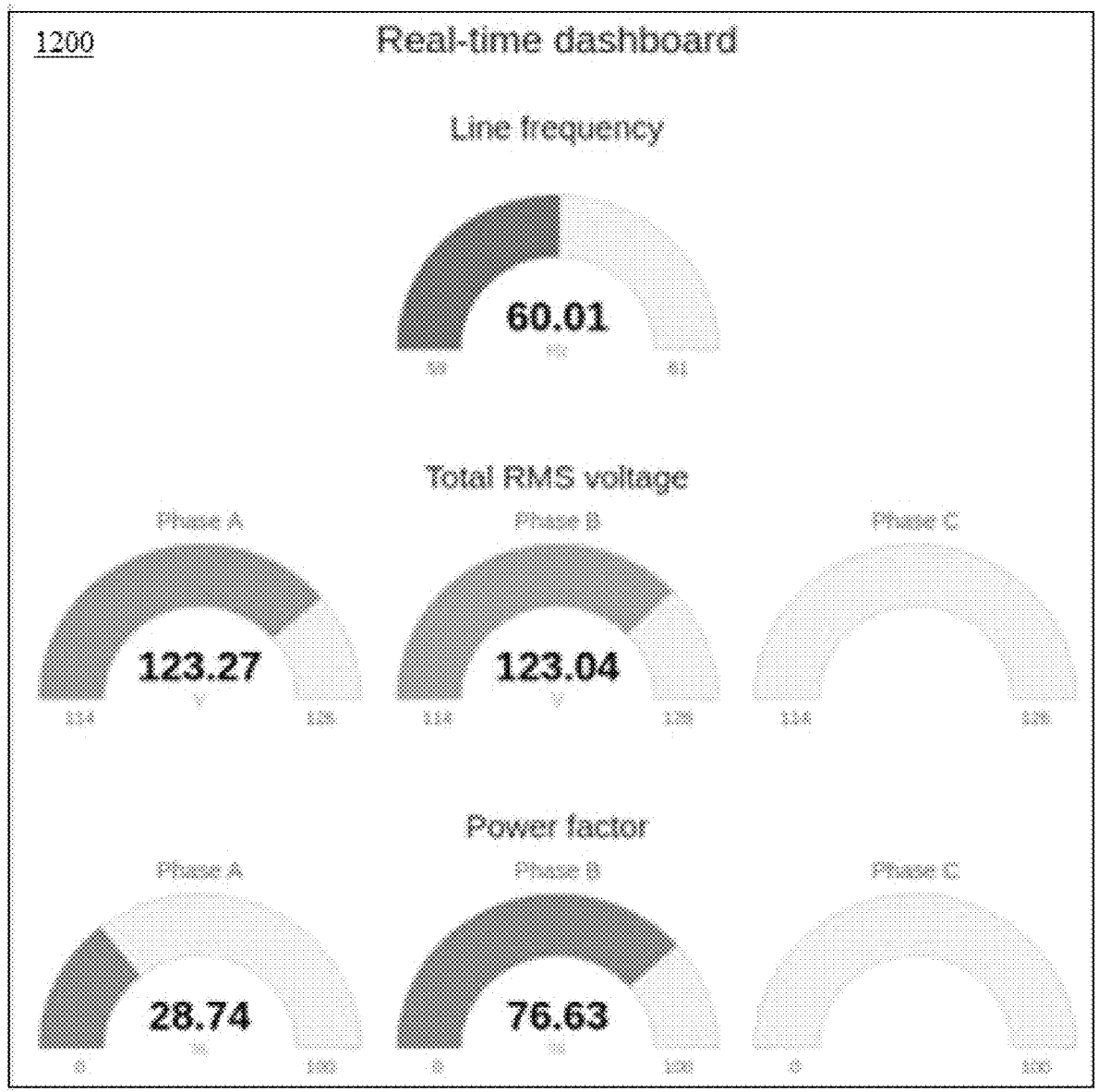
FIG. 12 illustrates an example graphical user interface (GUI) of a real-time dashboard of selected parameters.
Figure 13:
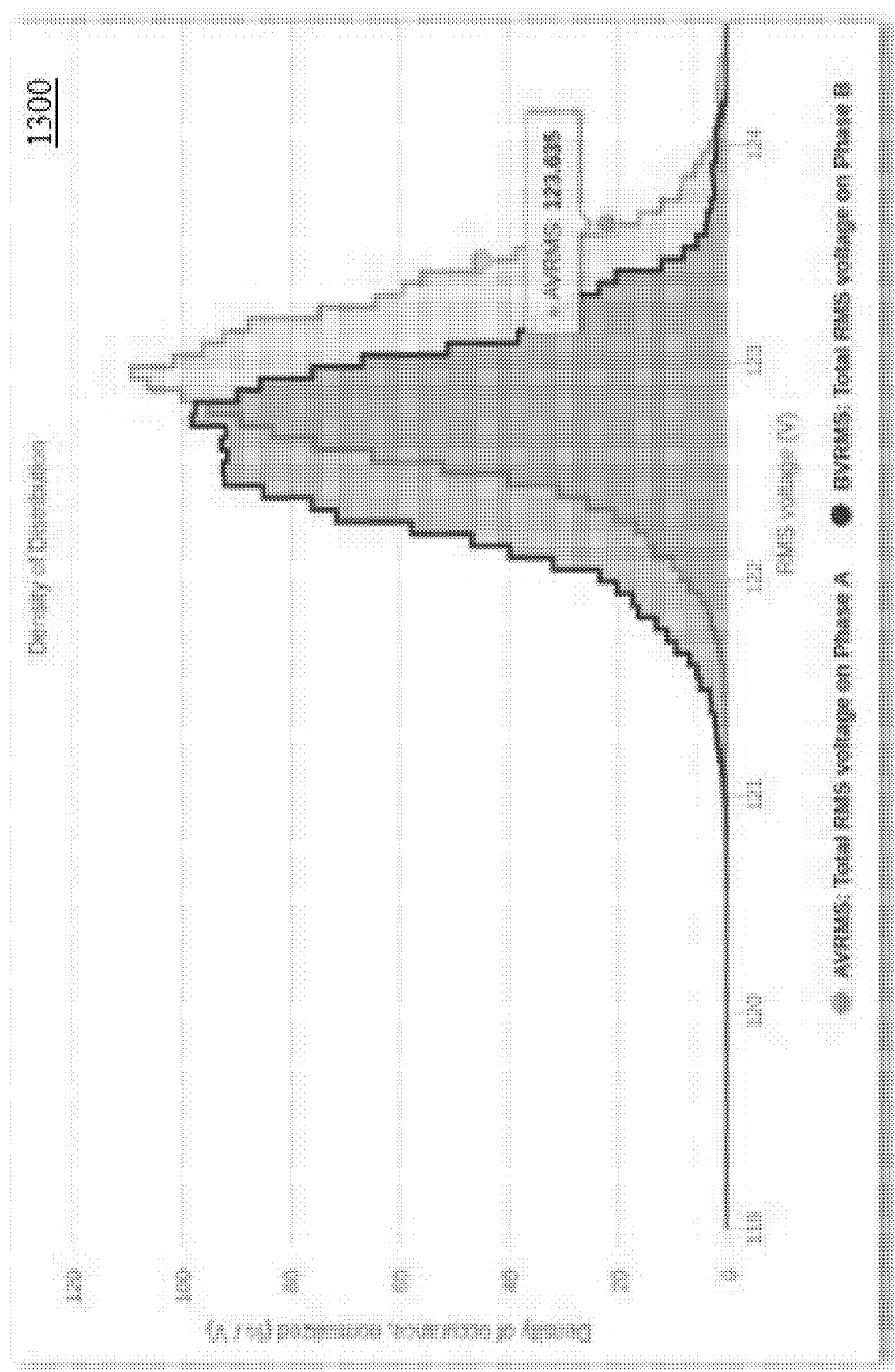
FIG. 13 illustrates an example comparison plot showing the density of distribution of total RMS voltage values between two phases.
Figure 14:
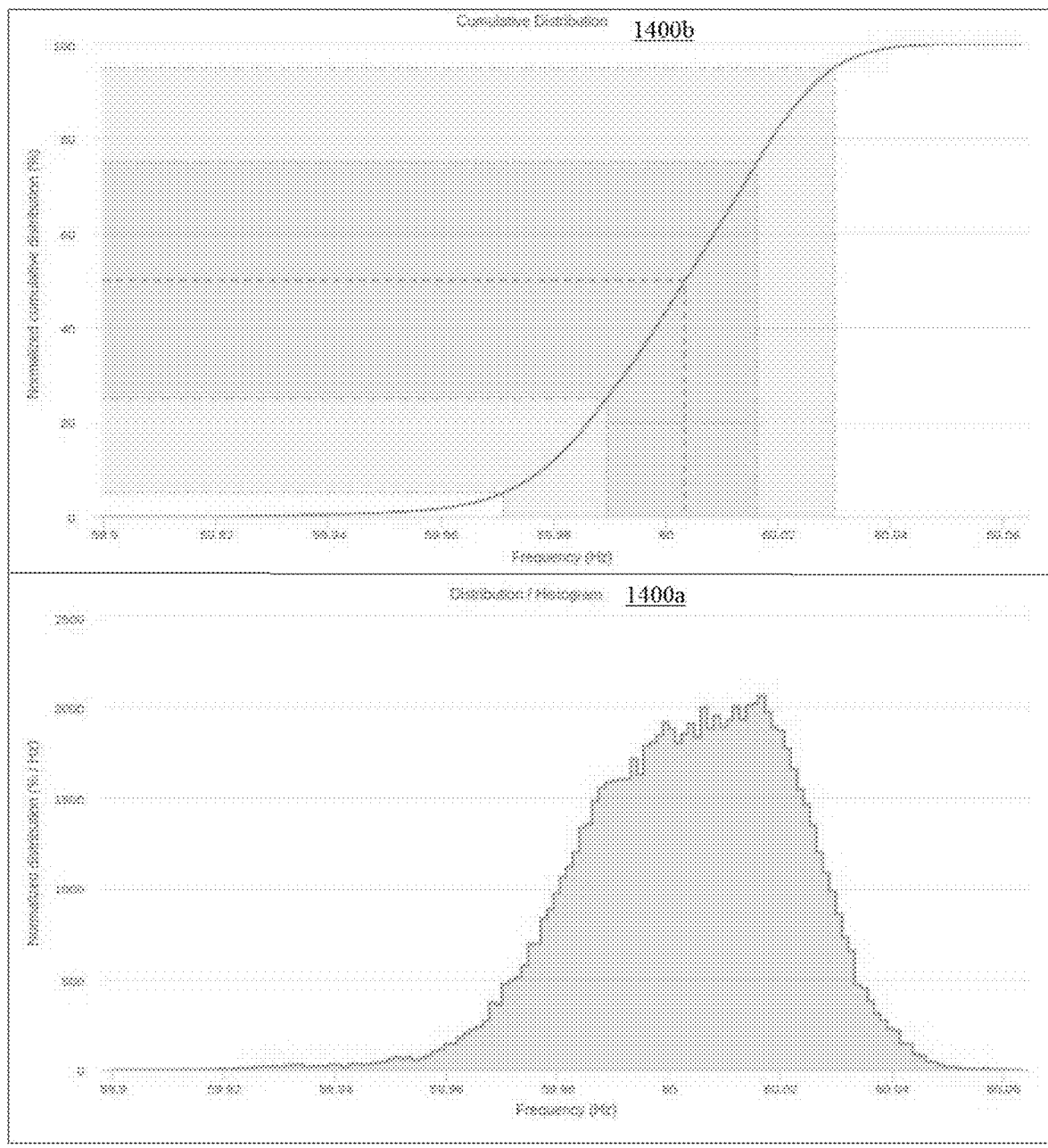
FIG. 14 illustrates an example correlation of a distribution/histogram of frequency compared to a cumulative distribution plot.

The number of measured, computed, and correlated values that can be displayed, historically or in real-time, is limited only by configuration of the devices and the systems. FIGS. 12-14 illustrate examples of graphical user interfaces (GUIs) and plots, though many possibilities exist. For instance, in FIG. 12, a GUI 1200 illustrates a real-time dashboard of selected parameters, including line frequency, total RMS voltage of phases A, B, and C (with no data), and a corresponding power factor of those phases. Illustratively, the visuals may provide greater insight than raw data, such as health meters (e.g., green-yellow-red, low-normal-high, etc.). FIG. 13, on the other hand, shows a comparison plot 1300 showing the density of distribution of total RMS voltage values between two phases (e.g., plotted against density of occurrence, normalized). As still another example, FIG. 14 illustrates a distribution/histogram of frequency 1400a, compared to a cumulative distribution plot 1400b (both normalized). Truly, the possibilities afforded by the distributed monitoring and analyzing techniques described herein are vast, and those shown herein are not meant to be limiting to the scope of the is present disclosure.

——Grid Control——

According to one or more embodiments of the present disclosure, the monitoring devices herein may be connected to real-time controllers to perform various actions within the grid, such as conservation voltage reduction (CVR), and to provide enhanced micro-grid resiliency.

Figure 15:
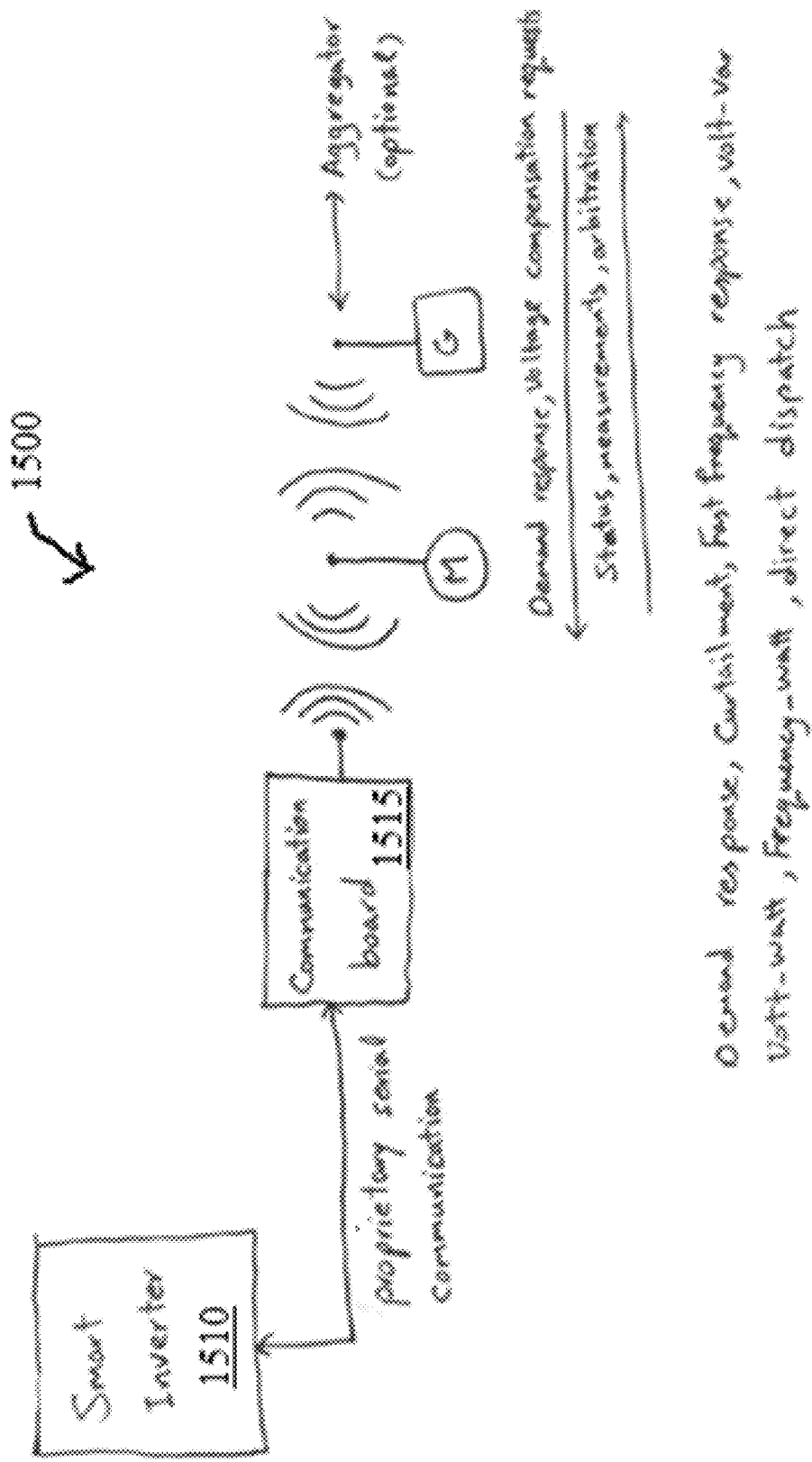
FIG. 15 illustrates an example of requests to and arbitration from advanced inverters.
Figure 16:
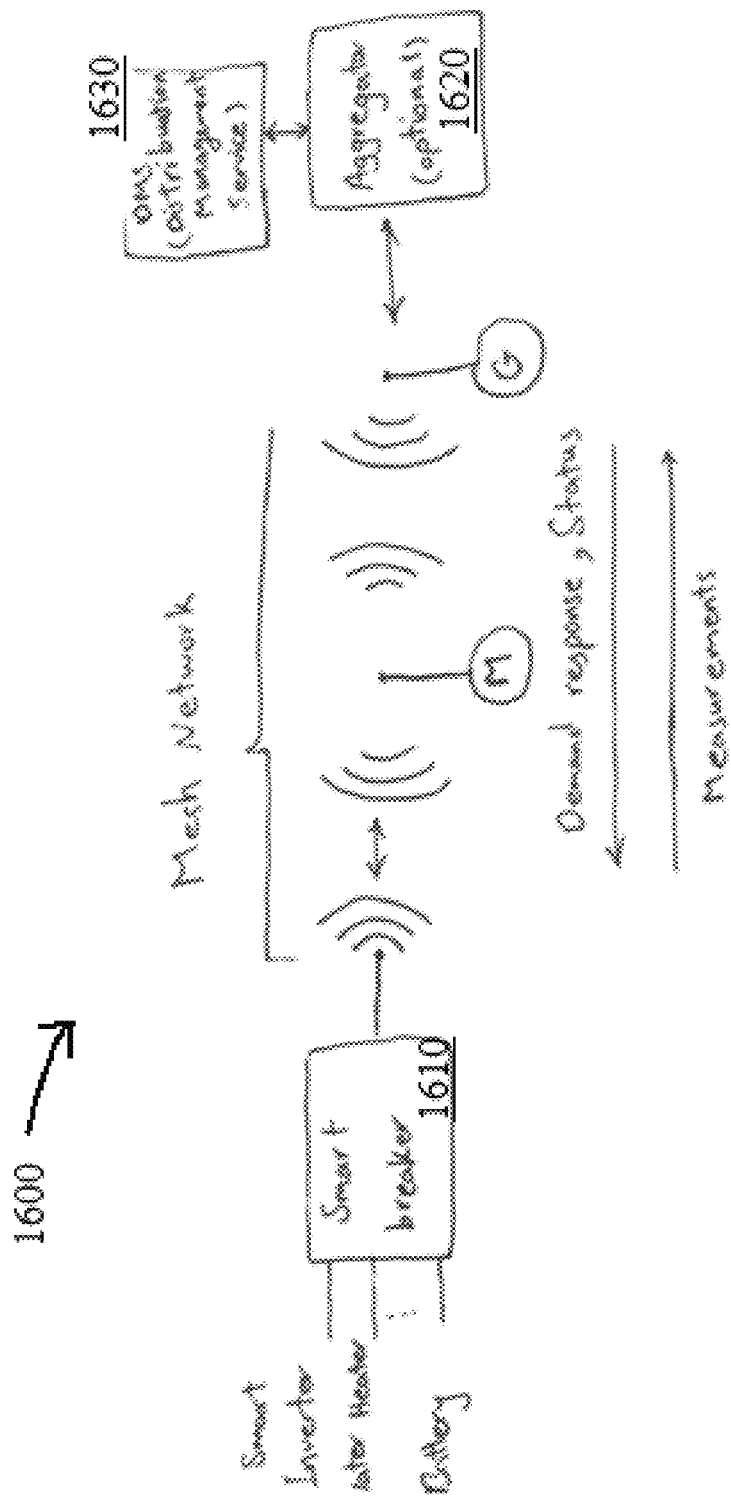
FIG. 16 illustrates an example of requests to and arbitration from demand response (DR) devices.

For example, as shown in FIGS. 15-16, the power monitor system's gateway (G) can receive periodic operational requests such as demand response (adjustment of active power output via various parameters), voltage compensation (injection of reactive power via various parameters), and ancillary services (fast frequency response, energy shifting, provision of operating reserves) from an aggregator or distribution management system (DMS). The gateway can then divide and send these requests to connected power monitors (M), which then further divides and sends these requests, as shown in FIG. 15, to advanced photovoltaic (PV) inverters 1510 (with associated communication board 1515) or, as shown in FIG. 16, to battery storage devices, electric vehicles (EVs), controllable loads such as water heaters, voltage compensators, or conservation voltage reduction (CVR) via wireless mesh communications or other means. The power monitor device then receives responses from the controlled devices which may include status, electrical measurements (voltage, current, active and reactive power), and arbitration (indication of the amount of the request that can be serviced, and optionally at what economic cost). The power monitor accordingly adjusts the division of the requests among devices and sends aggregated status, electrical measurements, and arbitration to the gateway. The gateway does the same among its connected power monitors, and sends aggregated status, electrical measurements, and arbitration to an optional additional aggregator 1620 and finally the DMS 1630. (Note that in environment 1500 of FIG. 15, showing requests to and arbitration from advanced PV inverters, depending on the capabilities of the inverter 1510, this may require a dedicated wireless communication/controller board. Also, in environment 1600 of FIG. 16, requests to and arbitration from demand response (DR) devices, depending on the capabilities of the inverter, this may require an advanced circuit breaker 1610 with wireless communications and controls.)

Figure 17:
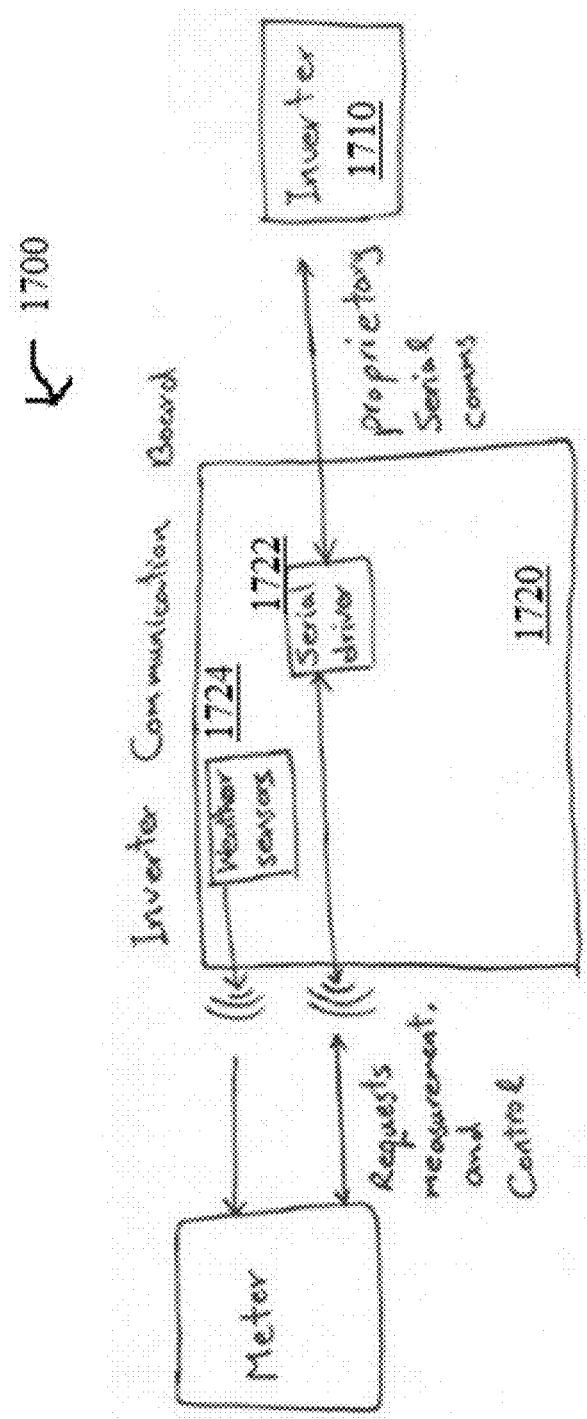
FIG. 17 illustrates an example environment where a device herein is to provide communication between the system and inverters or DR devices.

Furthermore, FIG. 17 illustrates an environment 1700 where the device is to provide communication between the system and PV inverters or DR devices. That is, some connected devices ("Inverter" 1710 to represent advanced inverters, battery storage devices, electric vehicles (EVs), controllable loads, voltage compensators, or conservation voltage reduction (CVR)) may require a dedicated wireless communications board 1720 as an interface to the power monitor ("Meter" 1730) system. This communication board, with an illustrative serial driver 1722, can also include weather sensors 1724 (incident solar radiation, temperature, humidity) to assist with the prediction of solar PV output for the benefit of system controls (e.g., mitigation of PV power ramp events).

Figure 18:
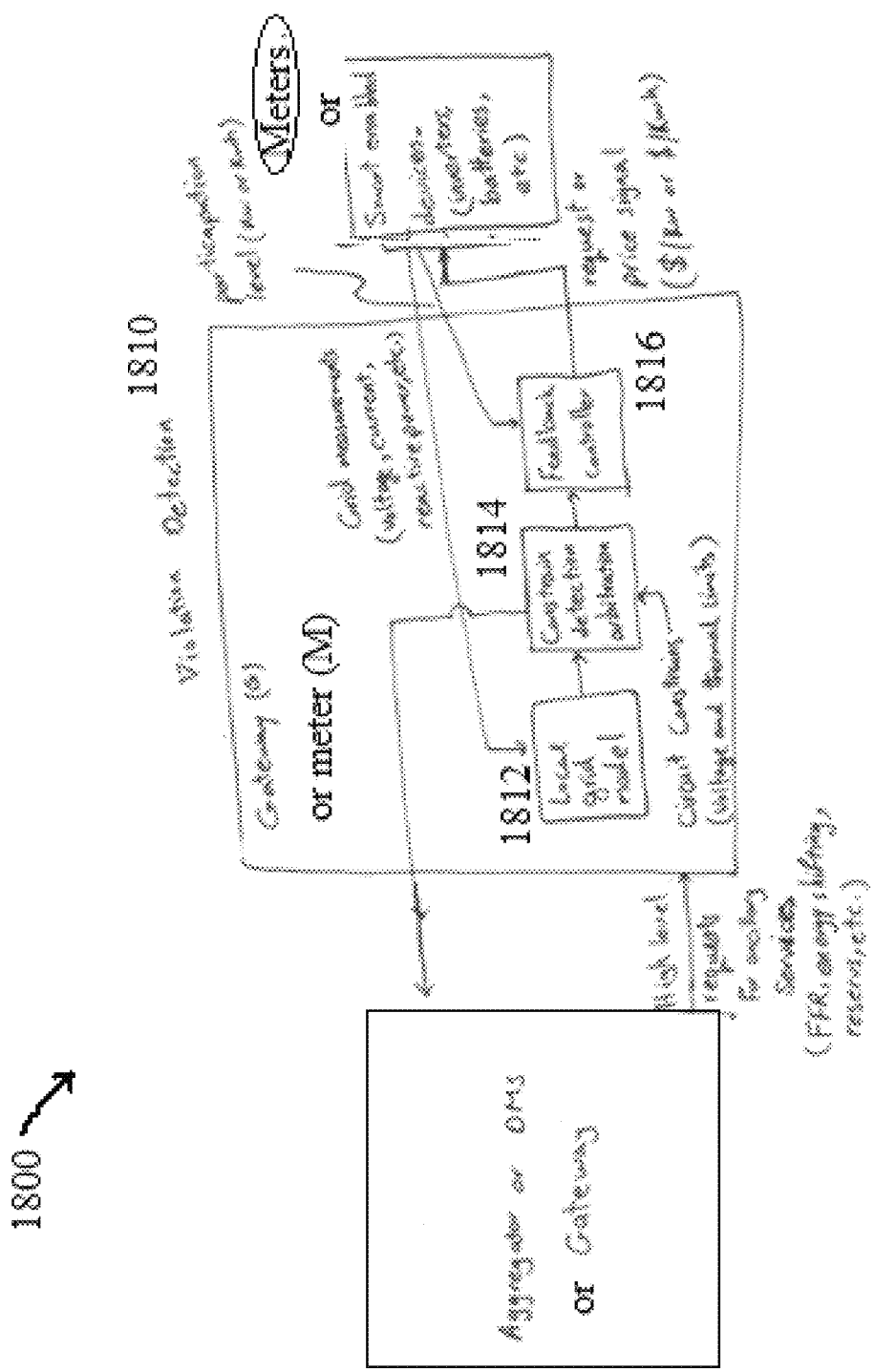
FIG. 18 illustrates an example environment for a voltage and thermal limit violation detector and predictor, generically for both gateways and meters.

Still further, FIG. 18 illustrates an environment 1800 for a voltage and thermal limit violation detector and predictor, generically for both gateways and meters. For instance, as shown, the power monitor gateways and meters can include a voltage and thermal limit violation detector and predictor 1810. This detector/predictor includes a mathematical model 1812 of the local area of the distribution circuit. Using this model along with measured and predicted conditions on the grid, it can detect or predict violations that may occur to the distribution circuit's voltage and thermal limits. This system can then adjust requests it receives from an aggregator or DMS for demand response, voltage compensation, and ancillary services to maintain operation within limits (constraint detection arbitration module 1814). These adjusted requests may be acted upon (with proper authority), or will be returned to the aggregator or DMS for arbitration. Meanwhile, the gateway or meter may also receive adjusted requests from its controlled devices (batteries, EVs, inverters, loads, CVR devices) for arbitration by a feedback controller 1816. Notably, the requests may take the form of an economic price signal.

Other control configurations based on the monitored and computed values herein may be available, and those mentioned herein are not meant to limit the scope of the is embodiments herein. In essence, by having the distributed monitors through a distribution grid, in addition to providing data input and calculations, the techniques herein may also provide further advantageous power grid control (e.g., communication to localized devices via corresponding monitoring devices), based on the computations herein or otherwise.

———Dynamic Device Configuration and Updating———

To provide additional flexibility and support for grid resiliency, the techniques herein have implemented an edge computing framework where each device can perform onboard analytics and controls in a semi-autonomous manner (thus operation can continue when communications or the server are compromised, and each device can take actions to restore normal operations). Additionally, by using a field programmable gate array (FPGA) instead of a standard microcontroller in the devices, the techniques herein achieve significantly more computing power and, more importantly, flexibility. The FPGA may be configured to implement logic modules and a soft-core processor that can be completely reconfigured—both at a software and hardware level—to provide the ultimate platform for research and development in real-time grid analytics and controls. For example, by remotely flashing code even after hardware is selected and the devices are deployed, it would be possible to implement an additional processor that is dedicated to a completely different functionality (e.g., improving cybersecurity). This FPGA platform would also enable very low latency controls by implementing algorithms directly at distribution transformers, utilizing logic elements rather than software as needed.

To enable over-the-air configuration of an FPGA, a bootloader application may allow the FPGA to perform Run-Time Self-Programming (RTSP) when sent a configuration file. Various bootloader options are available for use, and are outside the scope of the techniques herein, other than adapting an FPGA initialization file to merge bootloader code into the main application (loading the program into flash memory). Accordingly, though FIGS. 15-18 above describe conceived use cases for the power monitor device, the devices capabilities (e.g., computing resources including digital is signal controller, GPS, high-speed wireless communications, over-the-air programming and configuration, and the option for backup power) allow the device herein to serve not only these applications, but also others in the future with minimal or no hardware modifications. That is, these additional future use cases can be supported by software-definable functionality or "apps" that can be installed or removed as desired for the situation. These "apps" share the same data and hardware, but can operate semi-autonomously and independently.

Figure 19:
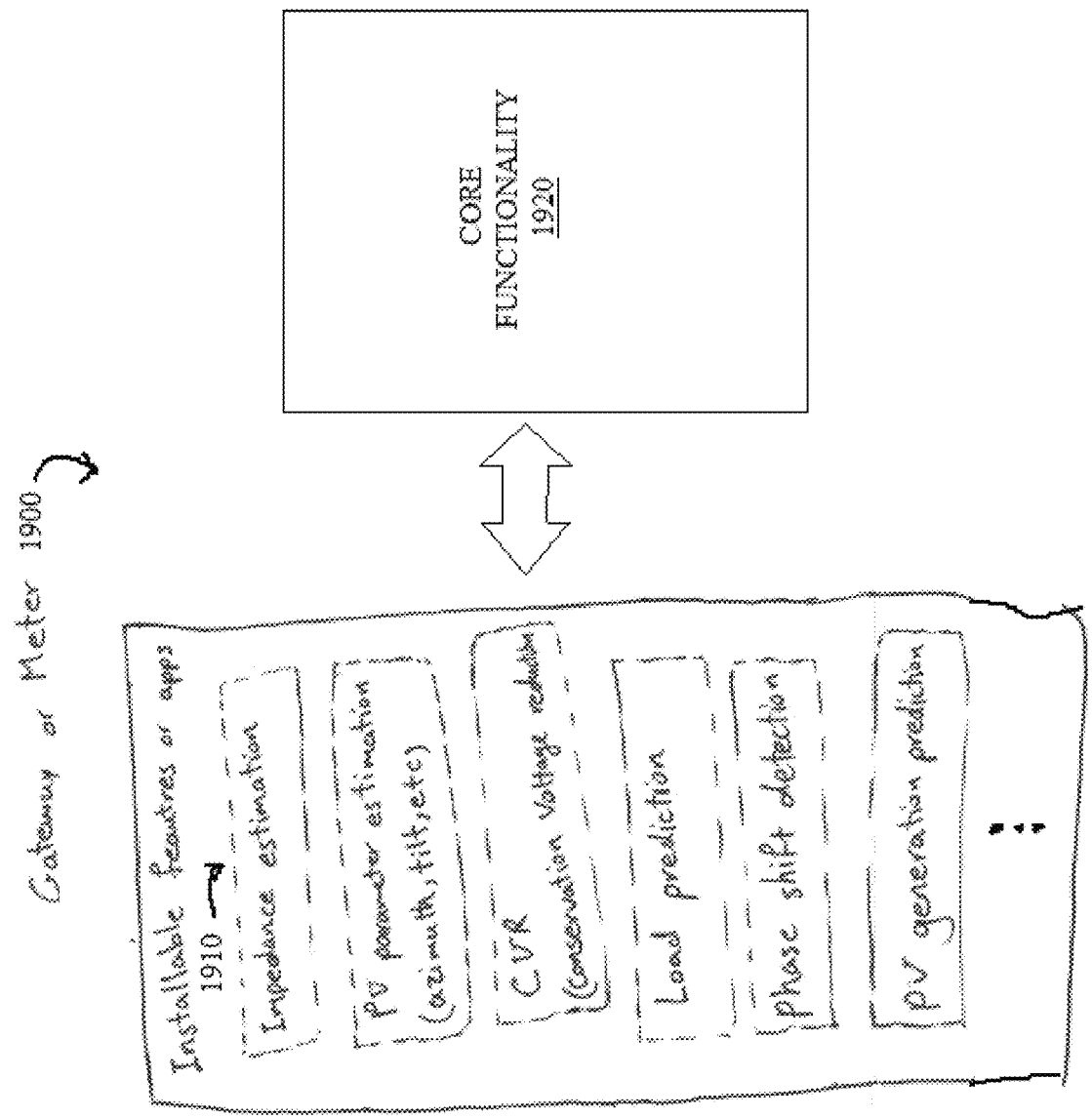
FIG. 19 illustrates an example device having features that can be installed or removed as desired, e.g., using over-the-air programming.

FIG. 19, for example, illustrates an example device 1900 having features 1910 that are embodied by software modules or "apps" that can be installed or removed as desired on the gateway or remote metering devices using over-the-air programming, and that share the core functionality 1920 (e.g., data, computing, sensors, etc.) as needed. Accordingly, the techniques herein provide a dynamically configurable grid monitoring device that can adapt to new requirements, new research, and new control algorithms that are developed over time, when based on monitored grid metrics and other capabilities (e.g., GPS, environmental sensors, etc.) already installed on the baseline device 1900.

CONCLUSION

The embodiments described above provide a distributed real-time and predictive grid modeling platform consisting of transformer-mounted measurement devices and residential gateways with access to real-time solar and smart meter data. The system measures and estimates grid parameters (e.g., line inductances and resistances) and topology (e.g., phasing) and provides a centralized interface for operational visibility of the distribution grid from the feeder down to the service level as well as concurrent model execution under various scenarios (e.g., of contingencies). Said differently, the techniques herein address the need for advanced distribution system visibility and controls which is currently not being served by aggregation-centric DERMS approaches and centralized, resource-intensive DSO. The techniques herein provide an innovative and potentially transformative solution for the electric grid because it could merge power flow modeling and sensing capabilities onto devices that can be distributed laterally and hierarchically over the grid to enable ubiquitous, coordinated model-based visibility and is controls.

To reiterate, generally, the techniques described above, FIG. 20 illustrates an example simplified procedure for distributed grid monitoring in accordance with one or more embodiments described herein. For example, a non-generic, specifically configured device (e.g., a computing device or controller) may perform procedure 2000 by executing stored instructions (e.g., a process stored in memory or as configuration of a microprocessor/FPGA). The procedure 2000 may start at step 2005, and continues et seq., where, as described in greater detail above, the following operations may be performed:

2010—determining, by a device configured to monitor a power grid, whether a configuration of a field-programmable gate array (FPGA) of the device requires updating, the configuration comprising one or more digital signal processor (DSP) applications (apps);

2015—updating, by the device when required, the configuration of the FPGA;

2020—measuring, by the device, grid metrics of a power grid, the grid metrics comprising at least a voltage and a current of one or more measured phases of the power grid;

2025—determining, by the device, a global positioning satellite (GPS)-based time;

2030—synchronizing, by the device, zero crossing events of the grid metrics to the GPS-based time;

2035—processing, by the device according to the one or more DSP apps, the grid metrics; and 2040—sharing, by the device, the processed grid metrics and synchronized zero crossing events.

Note that certain embodiments of the techniques herein may add to these steps, such as any of the following:

- communicating over a distributed mesh network to the gateway device, wherein the gateway device communicates over a backhaul network to one or more servers.
- wherein processing the grid metrics according to the one or more DSP apps comprises: receiving communication for grid control; and relaying the communication for grid control to one or more local devices configured to act on the relayed communication for grid control.
- responding to a primary power failure by recording primary power failure metrics to a non-volatile memory using a backup power supply.
- generating a display based on the grid metrics.
- receiving environmental sensor data; and performing computation based on the environmental sensor data in correlation with the grid metrics.
- wherein receiving the configuration comprises: receiving the configuration through an over-the-air (OTA) communication channel.
- wherein the configuration establishes a plurality of independently operable apps configured to share hardware and grid metrics.
- acting autonomously in response to a lack of communication with a controlling device.
- wherein processing the grid metrics according to the one or more DSP apps comprises: reporting policy violations based on the grid metrics and one or more policies.
- wherein processing the grid metrics according to the one or more DSP apps comprises: receiving grid control requests; and adjusting the grid control requests based on predictively keeping the grid metrics within limits of one or more local policies.
- wherein the policies are based on one or both of thermal limit violations or voltage limit violations.
- wherein processing the grid metrics according to the one or more DSP apps comprises: estimating an impedance of one or more individual circuit segments based on measured grid metric response to a transient event.
- performing one or more grid-based control actions based on the estimated impedance.
- wherein the grid-based control actions are selected from a group consisting of: a demand response (DR); and a conservation voltage reduction (CVR).
- aggregating estimated impedances of a plurality of individual circuit segments to generate an aggregated view of power grid impedance.
- measuring estimated impedances over a given period; and averaging the measured estimated impedances over the given period.
- detecting anomalies in estimated impedances based on the measured estimated impedances over the given period.
- establishing and dynamically updating the impedance parameters of an embedded power flow model.
- wherein the embedded power flow model encompasses harmonics, interharmonics, and sub-harmonics in addition to a fundamental line frequency.
- wherein the model is used as a basis to detect anomalies.
- wherein the model is used as a basis for model-based control.
- wherein the estimated impedance comprises an impedance corresponding to a fundamental frequency and one or more impedances corresponding to one or more respective harmonics.
- wherein the estimated impedance is derived from a relative frequency response over a spectrum selected from a group consisting of: sub-fundamental, fundamental, harmonic, and interharmonic frequencies.
- detecting a loose connection in the power grid based on a variable impedance;
- and reporting the loose connection.
- wherein the transient event is actively injected into the power grid as real and reactive power that is adequately distinguishable from noise on the power grid.
- wherein the actively injected transient event comprises encoded information to identify a source of the transient event.
- wherein a carrier for current modulation for the actively injected transient event is a corresponding line frequency.
- monitoring for the transient event in the grid metrics as a uniquely identifiable disturbance in the grid metrics.
- wherein monitoring comprises: resampling the grid metrics to multiples of a corresponding line frequency.
- wherein monitoring comprises: using a discretized continuous wavelet transform (D-CWT) to detect the uniquely identifiable disturbance.
- wherein monitoring comprises: using a fast Fourier transform (FFT) to detect the uniquely identifiable disturbance.

The procedure 2000 illustratively ends in step 2045, though notably with the ability to monitor, analyze, control, and so on over time (e.g., repeating procedure 2000 or portions thereof).

It should be noted that while certain steps within the simplified procedure 2000 may be optional as described above, the steps shown in FIG. 20 are merely examples for illustration, and certain other functions may be included or excluded as desired, and certain details mentioned herein may be performed within certain steps, across multiple steps, or in steps not specifically shown for clarity. Further, while a particular order of the steps is shown, this ordering is merely illustrative, and any suitable arrangement of the steps may be utilized without departing from the scope of the embodiments herein.

The techniques described herein, therefore, provide for distribution grid monitoring, analysis, and control. In particular, the combination of distributed power flow modeling and automatic parameter identification has the potential to revolutionize electric distribution by enabling next-generation DERMS. The techniques herein provide is greater distribution grid visibility, near real-time detection of distribution grid anomalies, assessment of CVR potential, and improved information for PV hosting capacity and interconnection studies. Through the greater visibility gained herein, and the enablement of proactive model-based controls, the techniques herein also address four of the five objectives outlined in the U.S. Office of Electricity's (OE's) Advanced Modeling Grid Research program, namely: 1) Enabling prevention rather than reaction to changing grid conditions; 2) Developing computational and control technology to improve system reliability, resiliency, security, and flexibility; 3) Improving grid visibility to prevent blackouts and improve reliability; and 4) Supporting the development of modeling tools and computations for grid operations and planning.

Notably, the techniques herein currently achieve at least the following technical goals:

Perform accurate, rapid primary+secondary simulations;
Accurately identify secondary circuit impedances;
Accurately identify primary circuit impedances;
Accurately measure real and reactive harmonic loads;
Accurately measure CVR load dependencies;
Quickly detect abnormal grid impedance;
Identify phasing;
Report metrics, including operating limit violations and/or fault detection and location; and
Provide continuous data streaming (rather than periodic file upload).

Additionally, in accordance with certain specific embodiments of the present disclosure, the techniques herein overcome the significant technical challenges and risks involved with the implementation of embedded models using algorithms such as Graph Trace Analysis (GTA) on edge computing devices to achieve distributed grid simulation (e.g., the computational and communications requirements could push the hardware design beyond what can be contained in an easily mountable device for distribution transformers). In particular, the techniques above apply time-synchronized harmonic analysis such as FFTs or D-CWTs (rather than phase locked loops as in established PMU principles) and model feedback loops for system identification, and specifically includes harmonics as well.

Furthermore, by providing for over-the-air configuration and programming as well as independent apps for specialized monitoring and control, the device described herein is more flexible than current technologies, and can achieve even more technical goals than specifically listed above. In particular, when fully integrated with existing controls and new programs, or even with future controls, the techniques herein could provide enhanced grid services such as voltage optimization, optimal power flow, non-wires alternatives (NWA) to expensive grid upgrades, refined CVR, high-speed distributed energy and grid services markets, near real-time detection of distribution grid anomalies (e.g., transformer failures or cyber-attacks), and other grid control strategies and algorithms yet unforeseen. For instance, next-generation DTM devices and customer smart meters with integrated model-based grid awareness and control capability can benefit from the techniques and devices described herein, as either a separate device providing an open architecture for connection with popular DERMS platforms, or else as an integrated component of future devices.

Moreover, the techniques herein provide significant cost savings over current technologies. By aggregating the data from multiple devices over a mesh network, fewer commercial data plans are required to transmit data to a server. This results in an ongoing operational cost savings of 90% or more. Also, by integrating into one device the features of multiple commercial devices that are currently required to perform the core functions, there is an equipment cost savings of 90% or more. In order to avoid the need for reinstallation, the device's microcontroller or FPGA has been selected to allow over-the-air configuration and programming (e.g., allowing run-time self-programming (RTSP) with the potential for over-the-air configuration and firmware updates).

In general, the techniques herein provide a tool that allows more homes to utilize and benefit from solar energy, reducing our dependence on fossil fuels, bringing the possibility of a completely renewable electric grid closer to a reality. By estimating grid impedances, the technology enables advanced CVR and reactive power compensation with the ability to increase the efficiency of the grid. That is, the techniques herein provide information to the utility companies that reduce uncertainty and the required engineering margins for approving DPV, drastically reducing the cost of DPV interconnection studies, and helping to detect anomalies on the grid. As such, more DPV may be approved and installed, which in turn is expected to make the impedance estimation scheme more accurate and effective.

With proper control, communications, processing, and accurate voltage sensors within the inverters, it is herein possible to create a model of the distribution circuit that is accurate to within 10%, transforming DPV inverters into a tool that helps enable even more DPV on the grid. In general, the techniques herein help encourage a trend towards DPV inverters that are more connected, resilient, and overall capable, and expand how grid services can be used by moving beyond strictly physical ancillary services to informational services that devices can provide. This may open new paths towards a grid that is truly adaptive and resilient.

While there have been shown and described illustrative embodiments that provide for distribution grid monitoring, analysis, and control, it is to be understood that various other adaptations and modifications may be made within the spirit and scope of the embodiments herein. For example, while certain embodiments are described herein with respect to certain impedance calculations, the techniques herein are not so limited, and may be used for other purposes, whether more simplistic or more complicated. Also, while certain applications are described for the flexible FPGA design herein, other use cases and applications, may be used in conjunction with the techniques herein. Further, though the techniques herein have been generally illustrated with power standards of the United States, other power parameters and standards (e.g., from other countries) may also take advantage of the techniques described herein. Moreover, while the techniques is described above are generally related to power grids, and particularly to distribution transformers (or in some examples substation transformers), the embodiments herein may be applied to any type of power grid (e.g., micro-grids) or other types of power grid devices that would benefit from monitoring, analysis, and control techniques described herein.

Illustratively, certain of the techniques described herein may be performed by hardware, software, and/or firmware, and any combination thereof. In particular, a non-generic computing device may be configured to execute one or more processes that may include computer executable instructions executed by a processor to perform functions relating to the techniques described herein. For instance, it is expressly contemplated that the components and/or elements described herein can be implemented as software being stored on a tangible (non-transitory) computer-readable medium (e.g., disks, CDs, RAM, EEPROM, etc.) having program instructions executing on a computer, hardware, firmware, or a combination thereof.

The foregoing description has been directed to specific embodiments. It will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
   a communication interface;
   one or more sensors;
   a global positioning satellite (GPS) module;
   a field-programmable gate array (FPGA) programmed with a process when executed operable to:
   determine, via a bootloader, whether a configuration of the FPGA requires updating, the configuration comprising one or more digital signal processor (DSP) applications (apps);
   update, when required, the configuration of the FPGA;
   obtain grid metrics of a power grid measured using the one or more sensors, the grid metrics comprising at least a voltage and a current of one or more measured phases of the power grid;
   determine a global positioning satellite (GPS)-based time using the GPS module;
   synchronize zero crossing events of the grid metrics to the GPS-based time;
   process, according to the one or more DSP apps, the grid metrics; and
   share, via the communication interface, the processed grid metrics and synchronized zero crossing events.

2. The apparatus as in claim 1, wherein the process when executed is further operable to:
   communicate, via the communication interface, over a distributed mesh network to a gateway device, wherein the gateway device communicates over a backhaul network to one or more servers.

3. The apparatus as in claim 1, wherein one of the one or more DSP apps when executed by the FPGA, are operable to receive communication for grid control and relay the communication for grid control to one or more local devices configured to act on the relayed communication for grid control.

4. The apparatus as in claim 1, further comprising:
   a backup power supply; and
   a non-volatile memory, wherein the process when executed is further operable to respond to a primary power failure by recording primary power failure metrics to the non-volatile memory using the backup power supply.

5. The apparatus as in claim 1, wherein the process when executed is further operable to:
   display the grid metrics on a display.

6. The apparatus as in claim 1, further comprising:
   one or more environmental sensors, wherein the process when executed is further operable to perform computation based on environmental sensor data in correlation with the grid metrics.

7. The apparatus as in claim 1, wherein the process when executed is further operable to:
   receive an updated configuration through an over-the-air (OTA) communication channel of the communication interface.

8. The apparatus as in claim 1, wherein the configuration establishes a plurality of independently operable apps configured to share hardware and grid metrics.

9. The apparatus as in claim 1, wherein one of the one or more DSP apps, when executed by the FPGA, are operable to estimate an impedance of one or more individual circuit segments based on measured grid metric response to a transient event.

10. The apparatus as in claim 9, wherein the one of the one or more DSP apps, when executed by the FPGA, are operable to perform one or more grid-based control actions based on the estimated impedance.

11. The apparatus as in claim 9, wherein the transient event is actively injected into the power grid as real and reactive power that is adequately distinguishable from noise on the power grid.

12. The apparatus as in claim 9, the one of the one or more DSP apps when executed by the FPGA, are operable to monitor for the transient event in the grid metrics as a uniquely identifiable disturbance in the grid metrics.

13. A method, comprising:
    determining, by a field-programmable gate array (FPGA) configured to monitor a power grid and via a bootloader of the FPGA, whether a configuration of the FPGA requires updating, the configuration comprising one or more digital signal processor (DSP) applications (apps);
    updating, by the FPGA when required, the configuration of the FPGA;
    obtaining, by the FPGA, grid metrics of theft power grid measured using one or more sensors, the grid metrics comprising at least a voltage and a current of one or more measured phases of the power grid;
    determining, by the FPGA, a global positioning satellite (GPS)-based time using a GPS module;
    synchronizing, by the FPGA, zero crossing events of the grid metrics to the GPS-based time;
    processing, by the FPGA according to the one or more DSP apps, the grid metrics; and
    sharing, by the FPGA and via a communication interface, the processed grid metrics and synchronized zero crossing events.

14. The method as in claim 13, further comprising:
    communicating, via the communication interface, over a distributed mesh network to a gateway device, wherein the gateway device communicates over a backhaul network to one or more servers.

15. The method as in claim 13, wherein processing the grid metrics according to the one or more DSP apps comprises:
    receiving communication for grid control; and relaying the communication for grid control to one or more local devices configured to act on the relayed communication for grid control.

16. The method as in claim 13, further comprising:
responding to a primary power failure by recording primary power failure metrics to a non-volatile memory using a backup power supply.

17. The method as in claim 13, further comprising:
generating a display based on the grid metrics.

18. The method as in claim 13, further comprising:
receiving environmental sensor data; and
performing computation based on the environmental sensor data in correlation with the grid metrics.

19. The method as in claim 13, wherein receiving the configuration comprises:
receiving the configuration through an over-the-air (OTA) communication channel.

20. The method as in claim 13, wherein the configuration establishes a plurality of independently operable apps configured to share hardware and grid metrics.

21. The method as in claim 13, further comprising:
acting autonomously in response to a lack of communication with a controlling device.

22. The method as in claim 13, wherein processing the grid metrics according to the one or more DSP apps comprises:
reporting policy violations based on the grid metrics and one or more policies.

23. The method as in claim 13, wherein processing the grid metrics according to the one or more DSP apps comprises:
receiving grid control requests; and
adjusting the grid control requests based on predictively keeping the grid metrics within limits of one or more local policies.

24. The method as in claim 23, wherein the policies are based on one or both of thermal limit violations or voltage limit violations.

25. The method as in claim 13, wherein processing the grid metrics according to the one or more DSP apps comprises:
estimating an impedance of one or more individual circuit segments based on measured grid metric response to a transient event.

26. The method as in claim 25, further comprising:
performing one or more grid-based control actions based on the estimated impedance.

27. The method as in claim 26, wherein the grid-based control actions are selected from a group consisting of: a demand response (DR); and a conservation voltage reduction (CVR).

28. The method as in claim 25, further comprising:
aggregating estimated impedances of a plurality of individual circuit segments to generate an aggregated view of power grid impedance.

29. The method as in claim 25, further comprising:
measuring estimated impedances over a given period; and
averaging the measured estimated impedances over the given period.

30. The method as in claim 29, further comprising:
detecting anomalies in estimated impedances based on the measured estimated impedances over the given period.

31. The method as in claim 29, further comprising:
establishing and dynamically updating the impedance parameters of an embedded power flow model.

32. The method as in claim 31, wherein the embedded power flow model encompasses harmonics, interharmonics, and sub-harmonics in addition to a fundamental line frequency.

33. The method as in claim 31, wherein the model is used as a basis to detect anomalies.

34. The method as in claim 31, wherein the model is used as a basis for model-based control.

35. The method as in claim 25, wherein the estimated impedance comprises an impedance corresponding to a fundamental frequency and one or more impedances corresponding to one or more respective harmonics.

36. The method as in claim 25, wherein the estimated impedance is derived from a relative frequency response over a spectrum selected from a group consisting of: subfundamental, fundamental, harmonic, and interharmonic frequencies.

37. The method as in claim 25, further comprising:
detecting a loose connection in the power grid based on a variable impedance; and
reporting the loose connection.

38. The method as in claim 25, wherein the transient event is actively injected into the power grid as real and reactive power that is adequately distinguishable from noise on the power grid.

39. The method as in claim 38, wherein the actively injected transient event comprises encoded information to identify a source of the transient event.

40. The method as in claim 38, wherein a carrier for current modulation for the actively injected transient event is a corresponding line frequency.

41. The method as in claim 25, further comprising:
monitoring for the transient event in the grid metrics as a uniquely identifiable disturbance in the grid metrics.

42. The method as in claim 41, wherein monitoring comprises:
resampling the grid metrics to multiples of a corresponding line frequency.

43. The method as in claim 41, wherein monitoring comprises:
using a discretized continuous wavelet transform (D-CWT) to detect the uniquely identifiable disturbance.

44. The method as in claim 41, wherein monitoring comprises:
using a fast Fourier transform (FFT) to detect the uniquely identifiable disturbance.

45. A tangible, non-transitory, computer-readable medium storing program instructions that cause a computer to execute a process, the process, when executed by a processor of a device configured to monitor a power grid, operable to:
determining, via a bootloader, whether a configuration of a field-programmable gate array (FPGA) of the device requires updating, the configuration comprising one or more digital signal processor (DSP) applications (apps);
updating, when required, the configuration of the FPGA;
obtaining grid metrics of a power grid using one or more sensors, the grid metrics comprising at least a voltage and a current of one or more measured phases of the power grid;
determining a global positioning satellite (GPS)-based time using a GPS module;
synchronizing zero crossing events of the grid metrics to the GPS-based time;

processing, according to the one or more DSP apps, the grid metrics; and sharing, via a communication interface, the processed grid metrics and synchronized zero crossing events.

\* \* \* \* \*